(12) United States Patent
Arvinte et al.

(10) Patent No.: US 12,710,998 B2
(45) Date of Patent: Aug. 18, 2026

(54) LATENCY AND DEPENDENCY-AWARE TASK SCHEDULING WORKLOADS ON MULTICORE PLATFORMS FOR ENERGY EFFICIENCY

(71) Applicant: Intel Corporation, Santa Clara, CA (US)

(72) Inventors: Marius O. Arvinte, Austin, TX (US); Maruti Gupta Hyde, Portland, OR (US); Mustafa Riza Akdeniz, San Jose, CA (US); Arjun Anand, Santa Clara, CA (US); Ravikumar Balakrishnan, Beaverton, OR (US); Nageen Himayat, Fremont, CA (US); Sumesh Subramanian, Pleasanton, CA (US); Alexander Bachmutsky, Sunnyvale, CA (US); John M. Belstner, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 17/560,174

(22) Filed: Dec. 22, 2021

(65) Prior Publication Data

US 2022/0114033 A1 Apr. 14, 2022

(51) Int. Cl.

*G06F 9/50* (2006.01)
*G06F 18/21* (2023.01)
*G06F 18/214* (2023.01)

(52) U.S. Cl.

CPC .......... *G06F 9/5083* (2013.01); *G06F 9/5038* (2013.01); *G06F 9/5044* (2013.01); *G06F 18/214* (2023.01); *G06F 18/217* (2023.01); *G06F 2209/5011* (2013.01); *G06F 2209/508* (2013.01)

(58) Field of Classification Search

None

See application file for complete search history.

(56) References Cited

U.S. PATENT DOCUMENTS

| | | | | |
|---|---|---|---|---|
| 2010/0077403 | A1* | 3/2010 | Yang | G06F 9/4881 718/104 |
| 2020/0089535 | A1* | 3/2020 | Du | G06N 5/01 |
| 2021/0373947 | A1* | 12/2021 | Kweon | G06F 9/4843 |

OTHER PUBLICATIONS

A2C, Stable Baselines 2.10.2 Documentation, (2016) available online at.https://stable-baselines.readthedocs.io/en/master/modules/a2c.html (8 pages).

(Continued)

*Primary Examiner* — Eric C Wai
(74) *Attorney, Agent, or Firm* — Alliance IP, LLC

(57) ABSTRACT

An apparatus, one or more computer readable media, a distributed edge computing system, and a method. The apparatus includes one or more processors to determine dependencies between sets of tasks of a plurality of tasks to be executed by a plurality of cores of a network; determine latency deadlines of respective ones of the plurality of tasks; and determine an allocation of individual ones of the plurality of among the plurality of cores for execution based on the dependencies and based on the latency deadlines.

20 Claims, 15 Drawing Sheets

(56) References Cited

OTHER PUBLICATIONS

Li, Ziyi et al., "Best Practice on IA, Intel FlexRAN reference architecture in the 5GNR," Intel Corporation (2018) (6 pages).

Mnih, Volodymyr et al., "Asynchronous Methods for Deep Reinforcement Learning," Proceedings of the 33rd International Conference on Machine Learning, New York NY (2016) W&CP vol. 48 (19 pages).

* cited by examiner

1000

1500

LATENCY AND DEPENDENCY-AWARE TASK SCHEDULING WORKLOADS ON MULTICORE PLATFORMS FOR ENERGY EFFICIENCY

FIELD

Embodiments relate to the scheduling of workload tasks amongst multiple cores within a platform, such as within a multicore platform of a cellular radio access network.

BACKGROUND

Energy consumption is a driving factor for the operating cost of high-performance computing systems. This problem is amplified for example for the Third Generation Partnership Project (3GPP)'s fifth generation (5G) Radio Access Network (RAN) workloads running on multicore systems, where the specific choice of a task scheduler influences a determination of which cores will enter a power saving state and the type of power saving state (e.g. idle power saving state or execution power saving state) applicable to each core, and thus influences the total energy consumption of the system. While there are solutions being developed for workloads that run on the core network, such as for the User Plane Function (UPF) workload in 5G, due to the extremely strict latency requirements of RAN workloads, the solutions for workloads that run on the core network are not applicable to RAN workloads. Currently, RAN workloads, when they run, run on server platforms at the highest core frequency all the time and are unable to take advantage of the power saving mechanisms of C-state (idle power saving states) and/or P-state (execution power saving state) optimizations that are available within the platform.

DETAILED DESCRIPTION

Mechanisms are needed to ensure power savings when tasks are allocated amongst cores within a multicore network, such as a 5G RAN network.

In addition to the issues already outlined above with respect to solutions for tasks that run on the core network not being applicable to 5G RAN workloads in terms of power savings, due to the standardized nature of 5G communications, tasks will incur dependencies (e.g., can only be executed after a parent task is finished) and will further be associated with different strict latency deadlines, which makes the optimal scheduling problem complex. Other factors that affect solving the problem of power savings in low latency communications may include, for example, the set of idle power states enabled on the platform, the operating frequency/voltage of the cores, the number of cores allocated to an application, and the specific 5G scenario applicable to the tasks being executed (e.g. the numerology of wireless communications associated with the tasks, the number of cells supported for the tasks, features enabled for the particular scenario such as whether any of the following are applicable: massive multiple input multiple output (MIMO), spectrum, millimeter wave (mmWave) spectrum, sub-6 GHz spectrum etc.), cell conditions such as density of users, time of day, etc.). Therefore, a number of factors such as the ones listed above can affect total energy consumption, as well as the optimal scheduling solution, and thus demand scheduling algorithms that can handle these factors or constraints effectively.

Embodiments propose novel solutions to the problem of scheduling tasks with the constraints of task-chain dependency and latency on multicore platforms, including on heterogenous multicore platforms with cores of different types instead of task allocation on cores of the same type. For example, task allocation according to some embodiments may take place on cores of different types, or one different types of compute components such as cores, graphic process units (GPUs), intelligence processing units (IPUs) etc. A "core" as referred to in the context of embodiments as described more particular in FIGS. 11-16 may refer to processing circuitry including one or more processors. A "core" as described in the context of embodiments may refer to a core that is within a single physical device or location, or a core in a distributed edge network as described in the context of relevant ones of FIGS. 1-10 below.

FIGS. 1-10 show example systems, networks, devices and/or platforms that may be used to implement some embodiments as described more particularly in the context of FIGS. 11-16.

Figure 1:
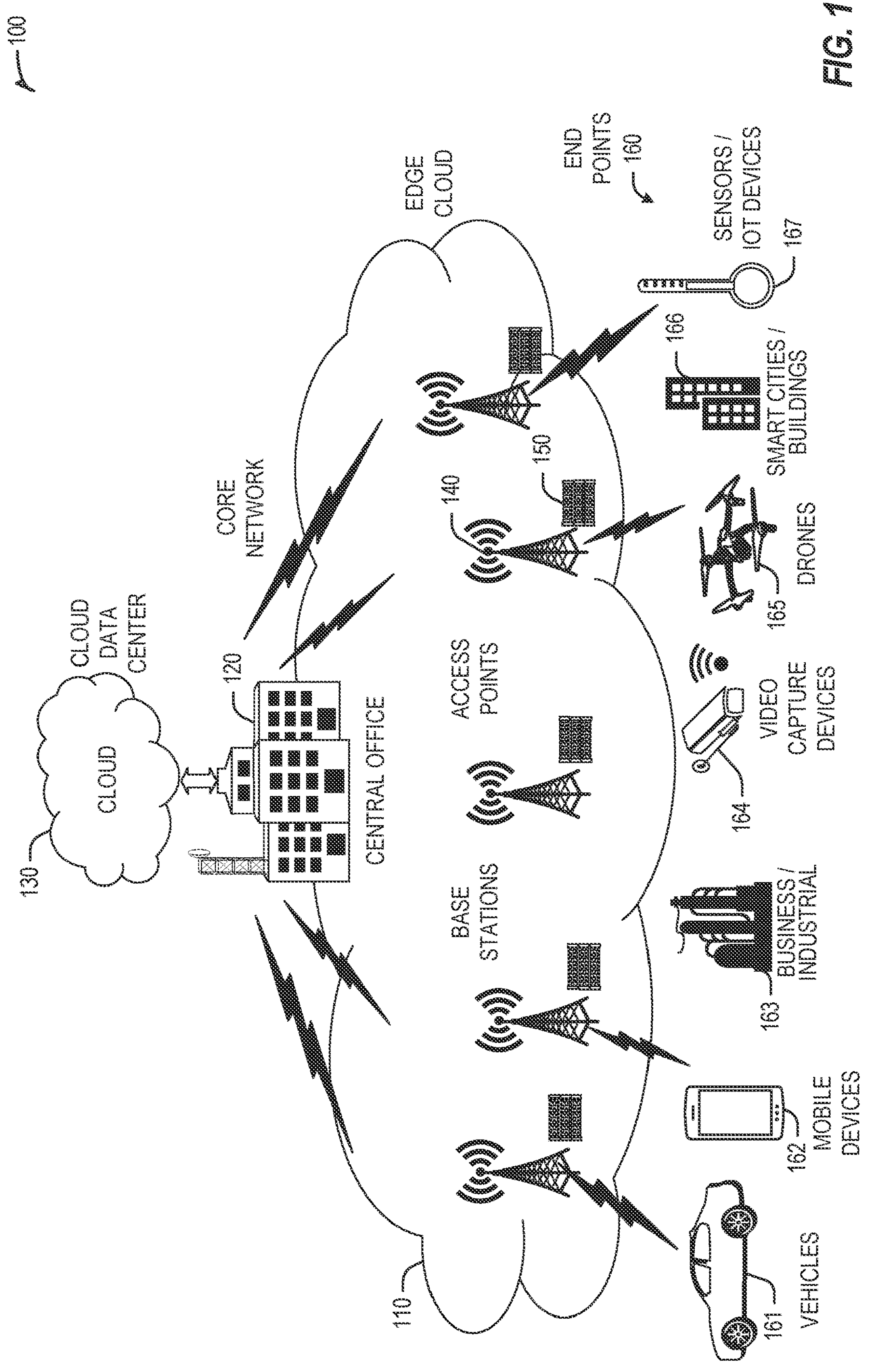
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data (e.g., at a "local edge", "close edge", or "near edge"). For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
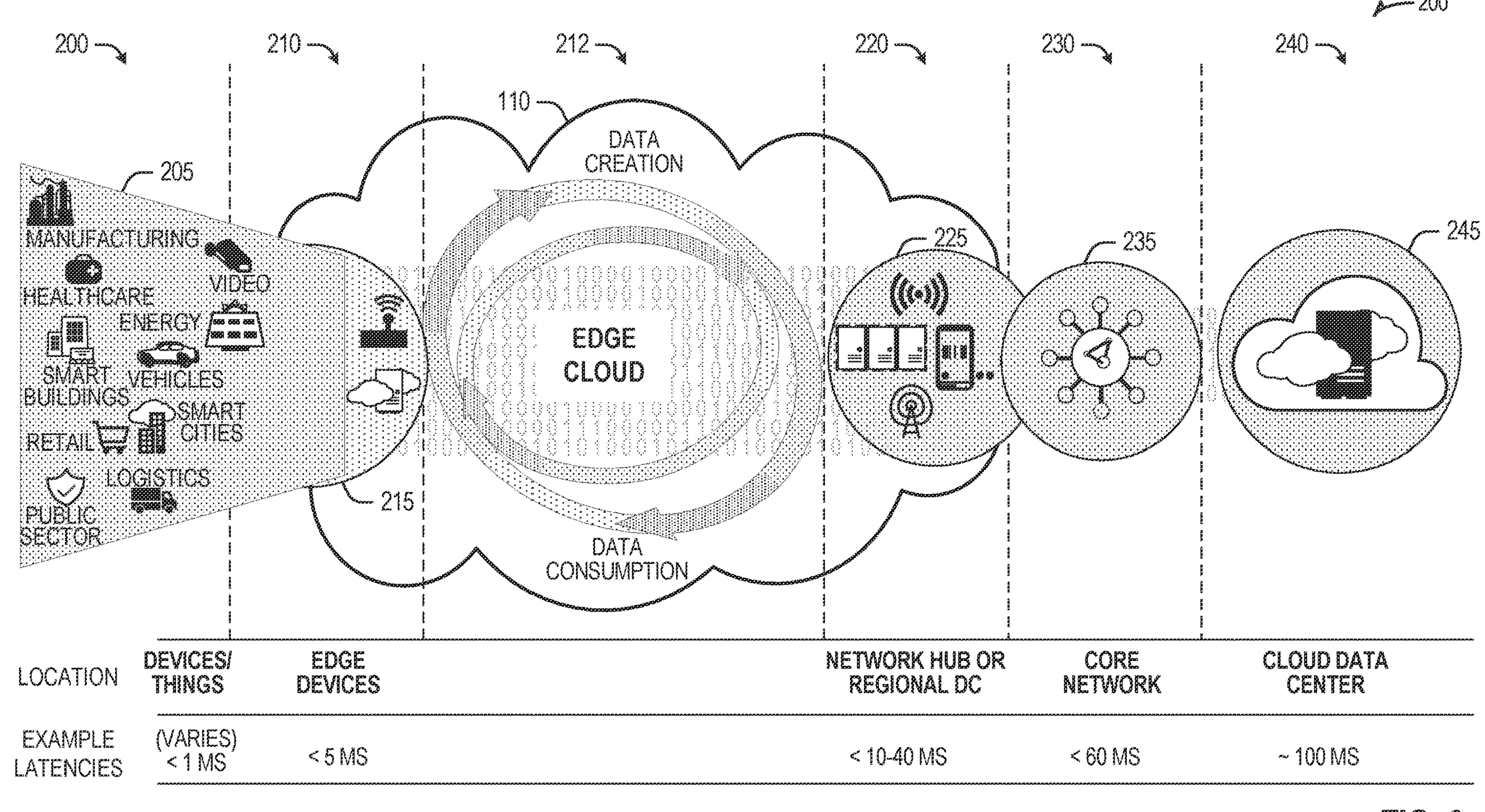
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210 (e.g., a "near edge" or "close edge" layer), to even between 10 to 40 ms when communicating with nodes at the network access layer 220 (e.g., a "middle edge" layer). Beyond the edge cloud 110 are core network 230 and cloud data center 240 layers, each with increasing latency (e.g., between 50-60 ms at the core network layer 230, to 100 or more ms at the cloud data center layer, both of which may be considered a "far edge" layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where greater memory bandwidth requires more power. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may be an appliance computing device that is a self-contained processing system including a housing, case or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
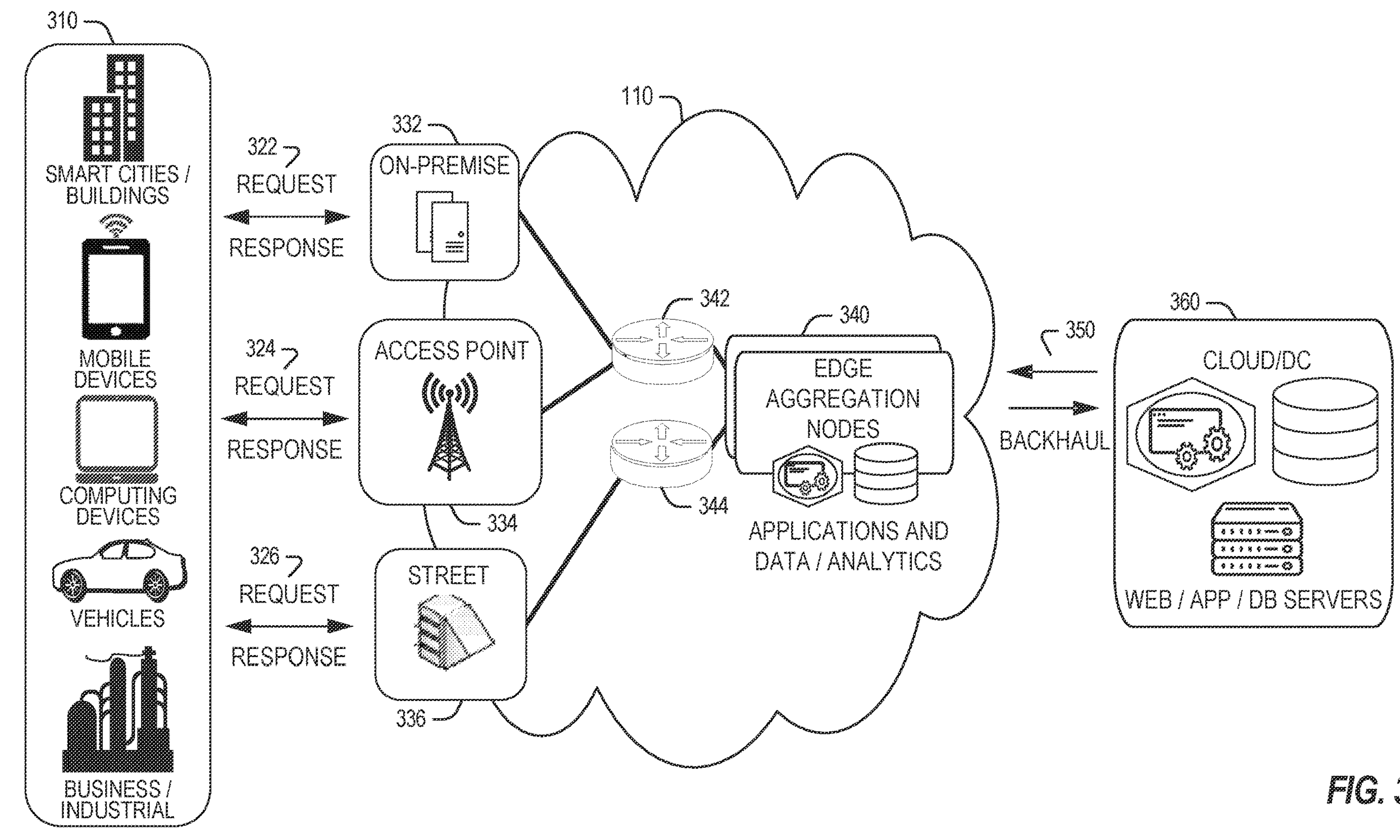
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
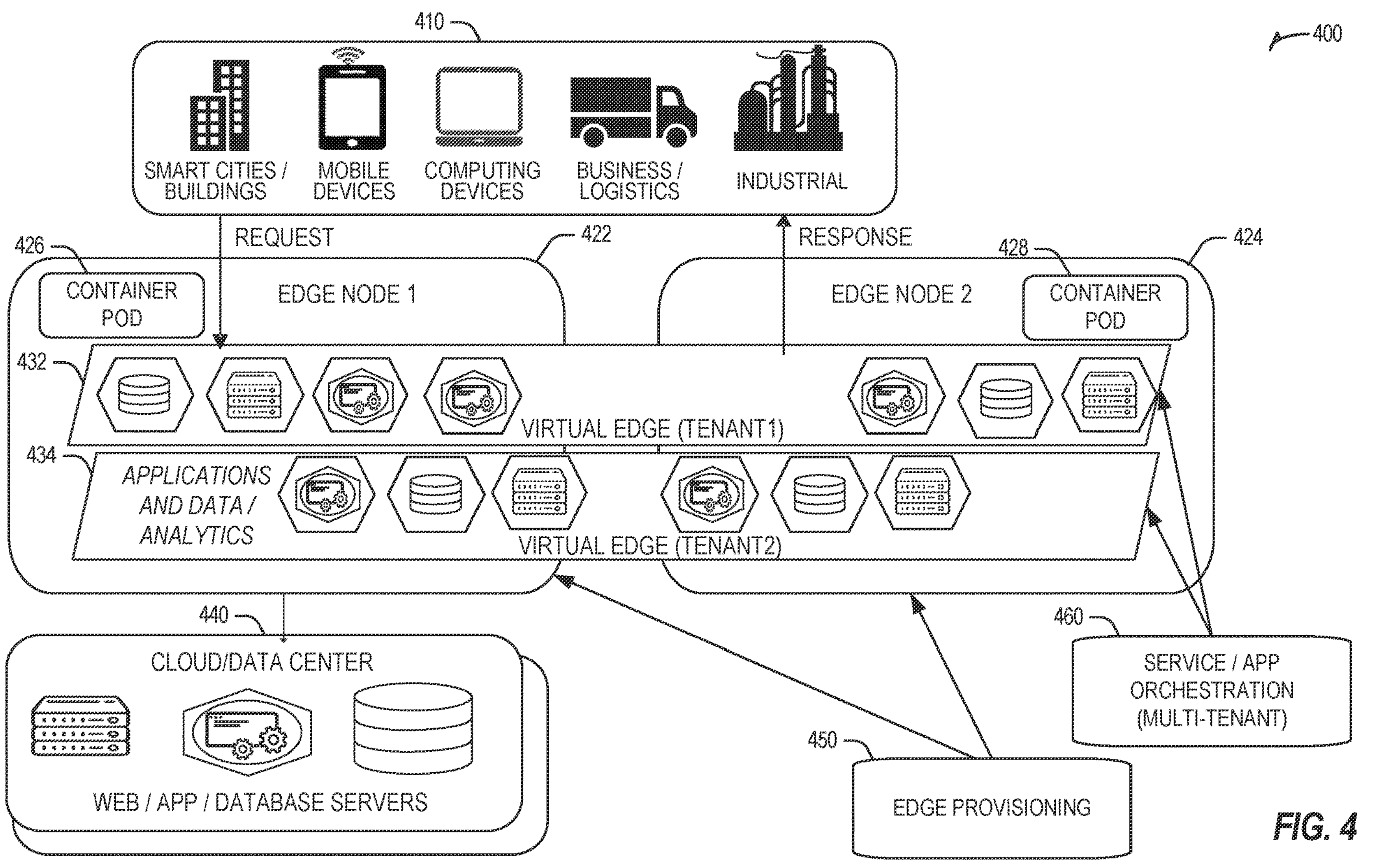
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Consistent with the Examples provided herein, a client computing node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
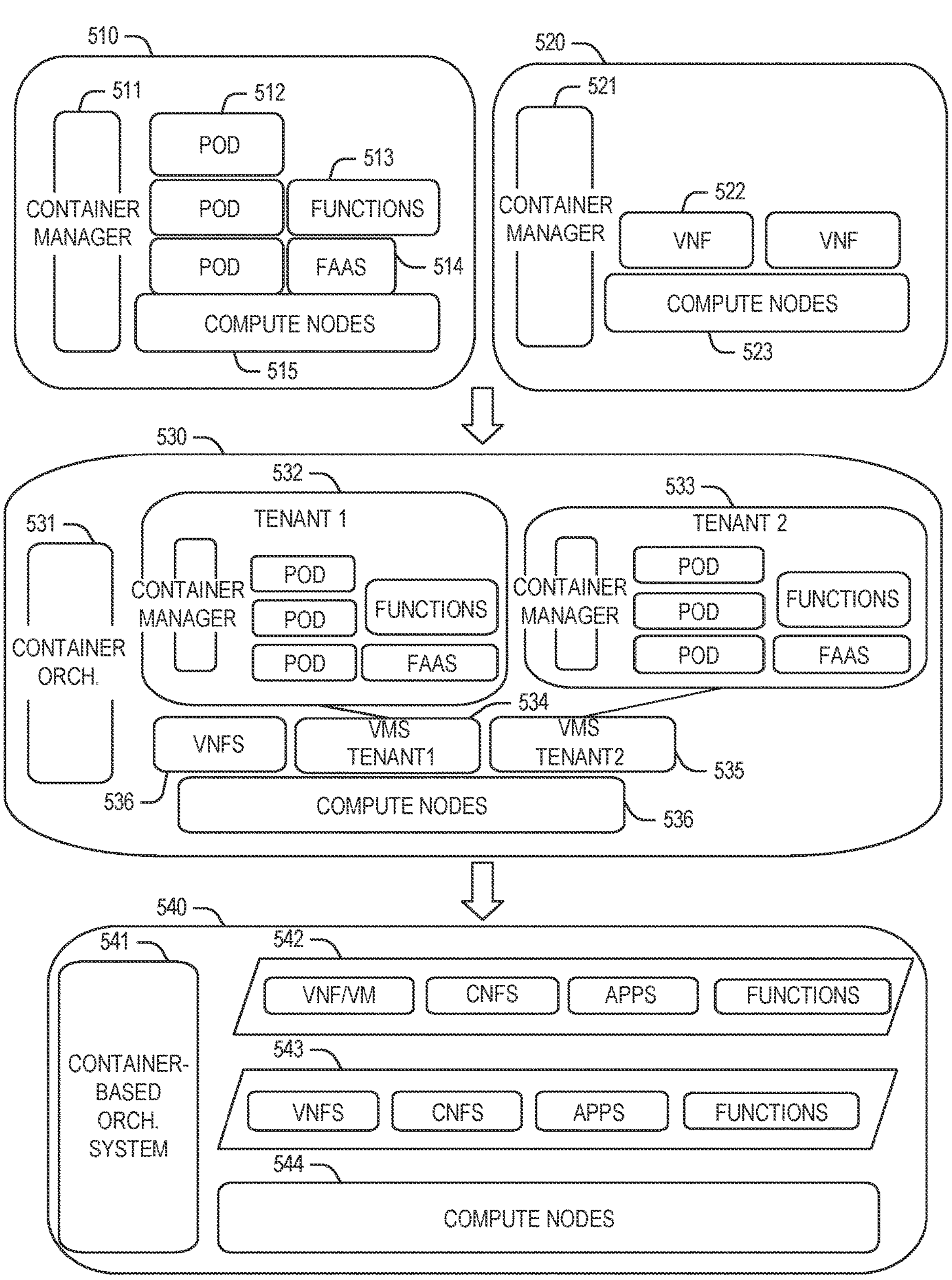
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 536), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
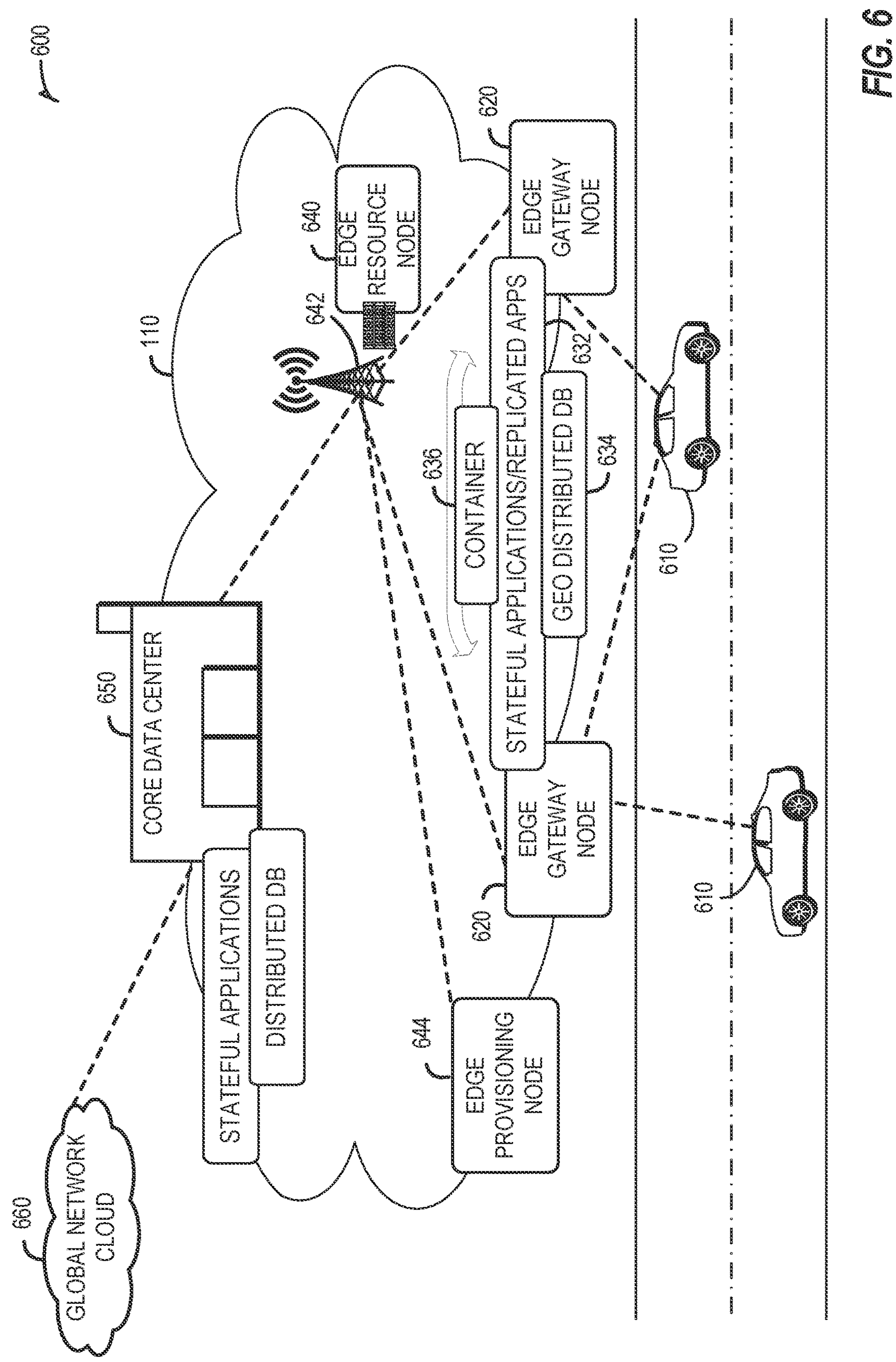
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
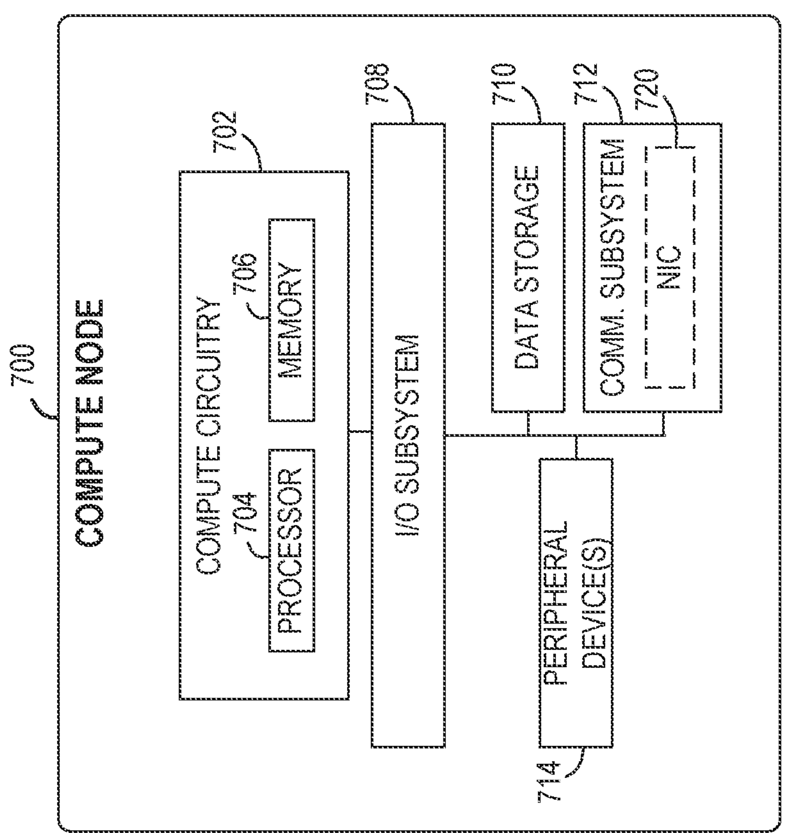
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multicore processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
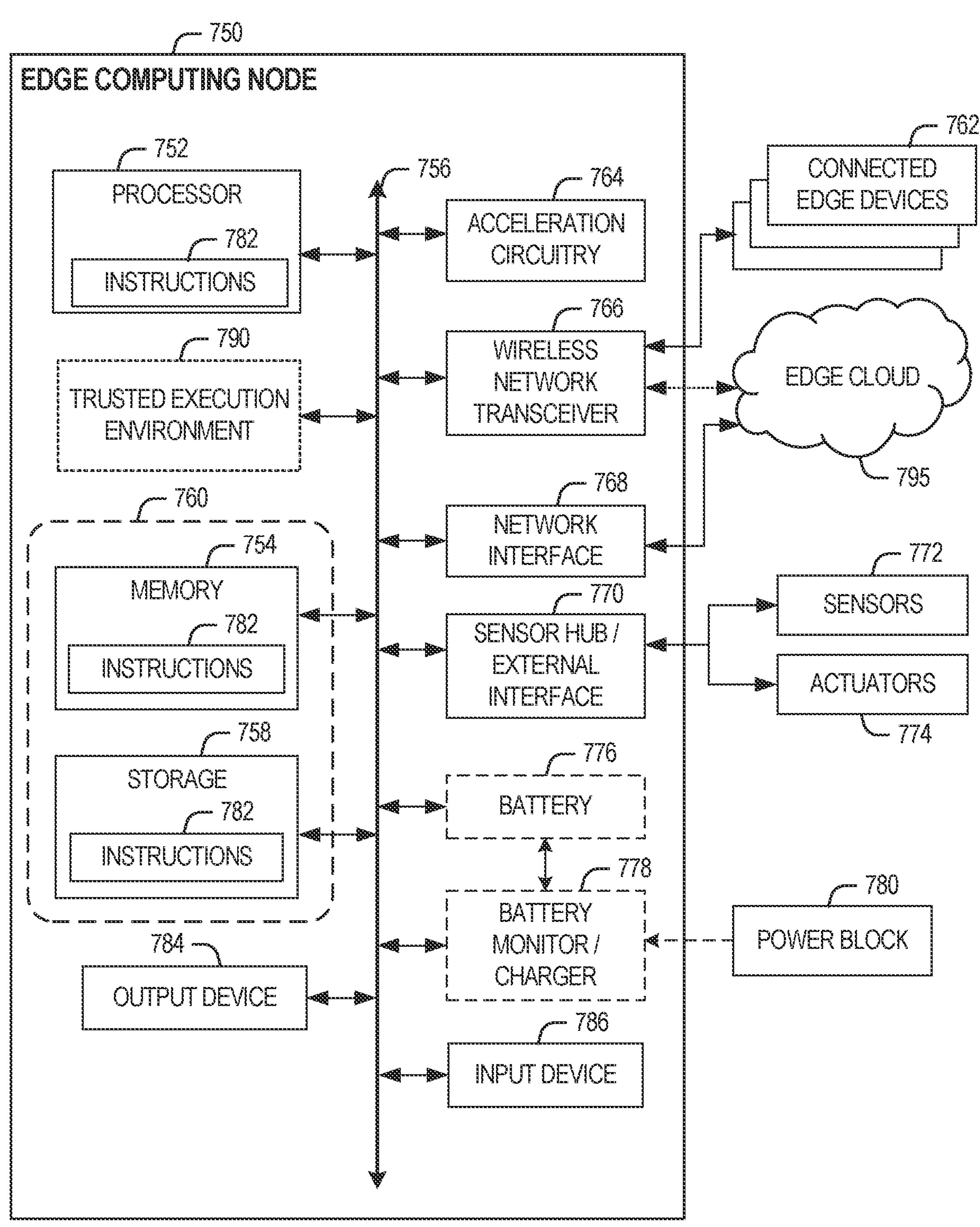
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multicore processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDEMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Machine Readable Medium and Distributed Software Instructions

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 9:
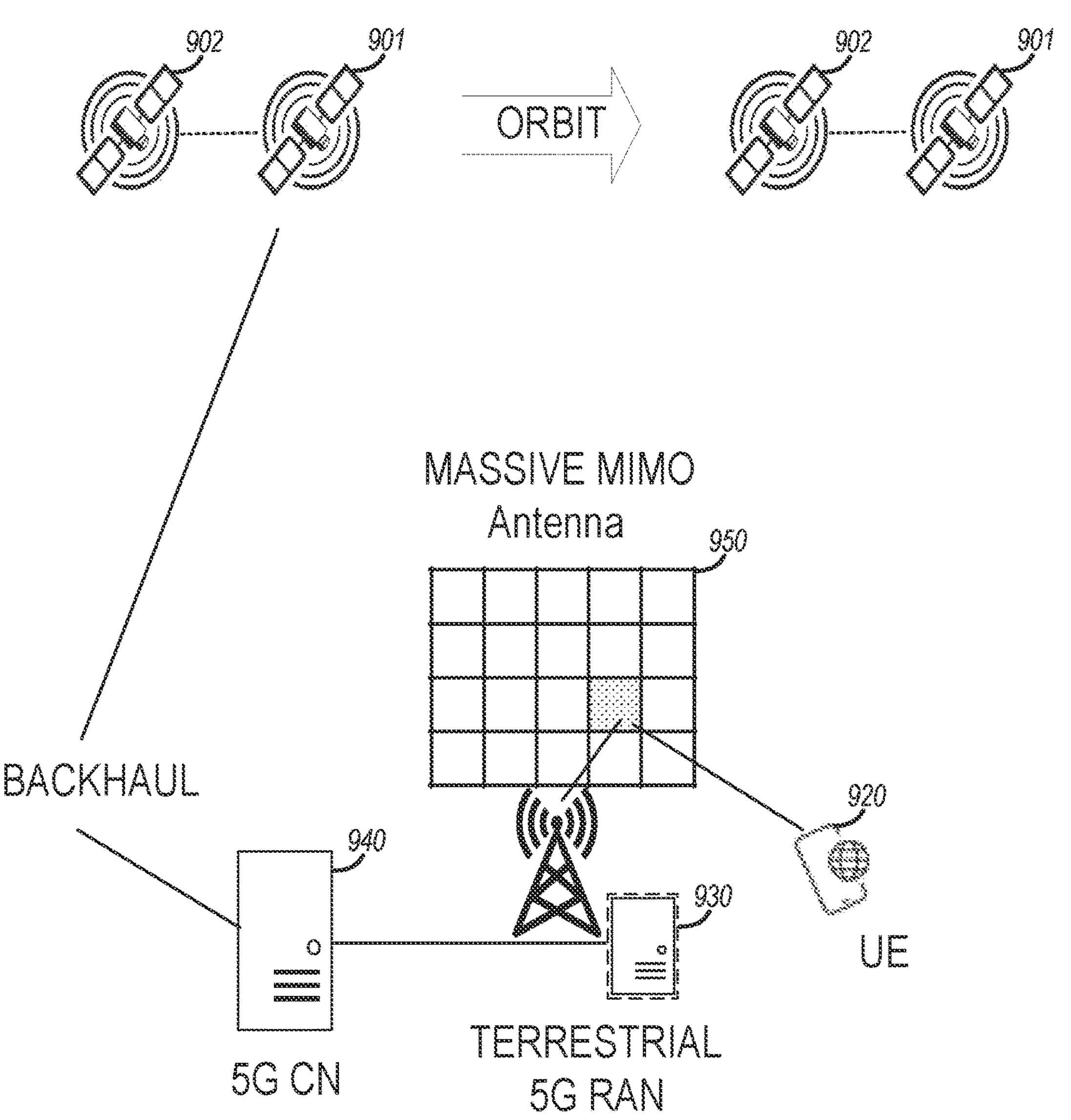
FIG. 9 illustrates network connectivity in non-terrestrial (satellite) and terrestrial (mobile cellular network) settings, according to an example.

At a more generic level, an edge computing system may be described to encompass any number of deployments operating in an edge cloud 110, which provide coordination from client and distributed computing devices. FIG. 9 provides a further abstracted overview of layers of distributed compute deployed among an edge computing environment for purposes of illustration.

Figure 8:
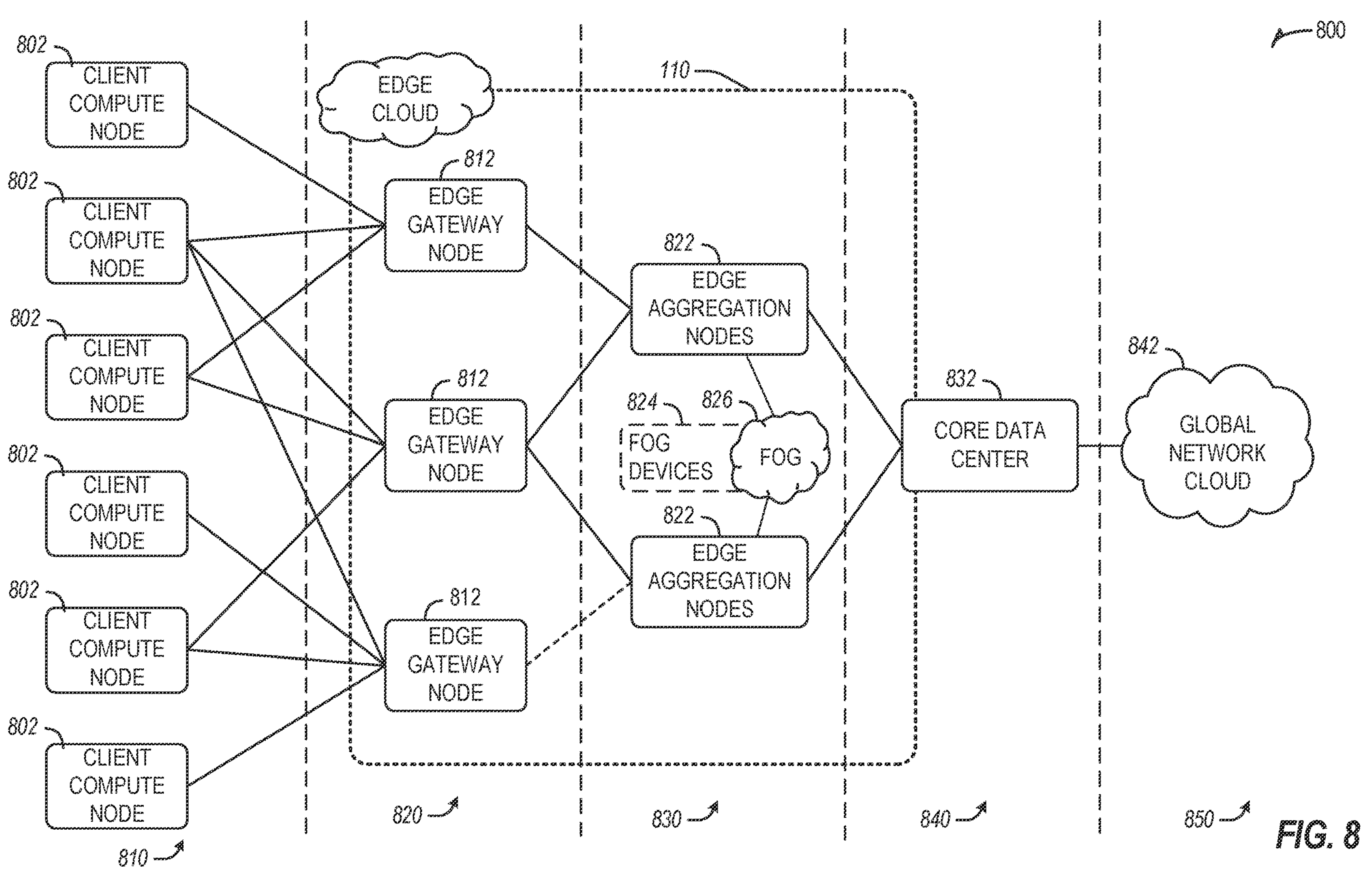
FIG. 8 illustrates an overview of layers of distributed compute deployed among an edge computing system, according to an example.

FIG. 8 generically depicts an edge computing system for providing edge services and applications to multi-stakeholder entities, as distributed among one or more client computing nodes 802, one or more edge gateway nodes 812, one or more edge aggregation nodes 822, one or more core data centers 832, and a global network cloud 842, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 810, 820, 830, 840, 850. For example, the client computing nodes 802 are each located at an endpoint layer 810, while each of the edge gateway nodes 812 are located at an edge devices layer 820 (local level) of the edge computing system. Additionally, each of the edge aggregation nodes 822 (and/or fog devices 824, if arranged or operated with or among a fog networking configuration 826) are located at a network access layer 830 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 832 is located at a core network layer 840 (e.g., a regional or geographically-central level), while the global network cloud 842 is located at a cloud data center layer 850 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 832 may be located within, at, or near the edge cloud 110.

Although an illustrative number of client computing nodes 802, edge gateway nodes 812, edge aggregation nodes 822, core data centers 832, global network clouds 842 are shown in FIG. 8, it should be appreciated that the edge computing system may include more or fewer devices or systems at each layer. Additionally, as shown in FIG. 8, the number of components of each layer 810, 820, 830, 840, 850 generally increases at each lower level (i.e., when moving closer to endpoints). As such, one edge gateway node 812 may service multiple client computing nodes 802, and one edge aggregation node 822 may service multiple edge gateway nodes 812.

Consistent with the examples provided herein, each client computing node 802 may be embodied as any type of end point component, device, appliance, or "thing" capable of communicating as a producer or consumer of data. Further, the label "node" or "device" as used in the edge computing system 800 does not necessarily mean that such node or device operates in a client or agent/minion/follower role; rather, any of the nodes or devices in the edge computing system 800 refer to individual entities, nodes, or subsystems which include discrete or connected hardware or software configurations to facilitate or use the edge cloud 110.

As such, the edge cloud 110 is formed from network components and functional features operated by and within the edge gateway nodes 812 and the edge aggregation nodes 822 of layers 820, 830, respectively. The edge cloud 110 may be embodied as any type of network that provides edge computing and/or storage resources which are proximately located to radio access network (RAN) capable endpoint devices (e.g., mobile computing devices, IoT devices, smart devices, etc., which may be compatible with O-RAN specifications), which are shown in FIG. 8 as the client computing nodes 802. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 826 (e.g., a network of fog devices 824, not shown in detail), which may be embodied as a system-level horizontal and distributed architecture that distributes resources and services to perform a specific function. For instance, a coordinated and distributed network of fog devices 824 may perform computing, storage, control, or networking aspects in the context of an IoT system arrangement. Other networked, aggregated, and distributed functions may exist in the edge cloud 110 between the cloud data center layer 850 and the client endpoints (e.g., client computing nodes 802). Some of these are discussed in the following sections in the context of network functions or service virtualization, including the use of virtual edges and virtual services which are orchestrated for multiple stakeholders.

The edge gateway nodes 812 and the edge aggregation nodes 822 cooperate to provide various edge services and security to the client computing nodes 802. Furthermore, because each client computing node 802 may be stationary or mobile, each edge gateway node 812 may cooperate with other edge gateway devices to propagate presently provided edge services and security as the corresponding client computing node 802 moves about a region. To do so, each of the edge gateway nodes 812 and/or edge aggregation nodes 822 may support multiple tenancy and multiple stakeholder configurations, in which services from (or hosted for) multiple service providers and multiple consumers may be supported and coordinated across a single or multiple compute devices.

Use Case: Satellite Edge Connectivity

FIG. 9 illustrates network connectivity in non-terrestrial (satellite) and terrestrial (mobile cellular network) settings, according to an example. As shown, a satellite constellation may include multiple satellites 901, 902, which are connected to each other and to one or more terrestrial networks. Specifically, the satellite constellation is connected to a backhaul network, which is in turn connected to a 5G core network 940. The 5G core network is used to support 5G communication operations at the satellite network and at a terrestrial 5G radio access network (RAN) 930. The RAN may be compatible with O-RAN specifications, in certain embodiments.

FIG. 9 also depicts the use of the terrestrial 5G RAN 930, to provide radio connectivity to a user equipment (UE) 920 via a massive MIMO antenna 950. It will be understood that a variety of network communication components and units are not depicted in FIG. 9 for purposes of simplicity. With these basic entities in mind, the following techniques describe ways in which terrestrial and satellite networks can be extended for various edge computing scenarios.

Figure 10:
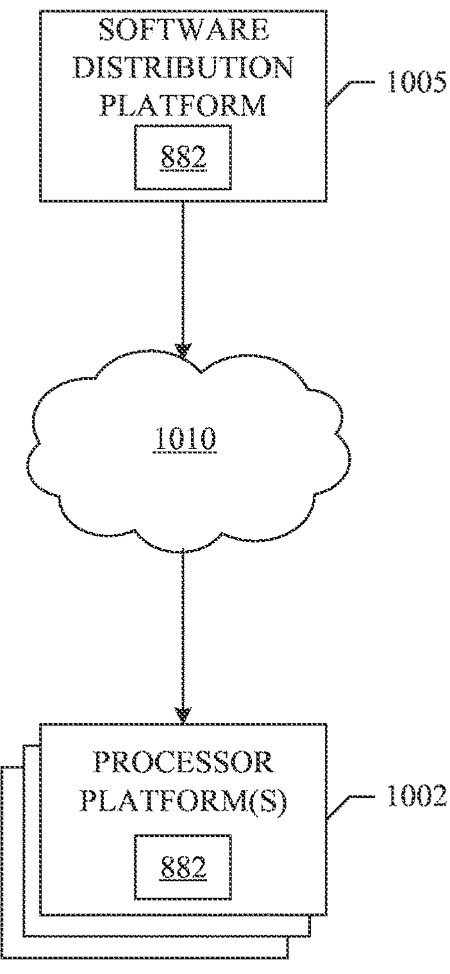
FIG. 10 illustrates an example software distribution platform to distribute software, such as the example computer readable instructions FIG. 8, to one or more devices.

Software Distribution:

FIG. 10 illustrates an example software distribution platform 1005 to distribute software, such as the example computer readable instructions 882 of FIG. 8, to one or more devices, such as example processor platform(s) 1000 and/or example connected edge devices 862. The example software distribution platform 1005 may be implemented by any computer server, data facility, cloud service, etc., capable of storing and transmitting software to other computing devices (e.g., third parties, the example connected edge devices 862 of FIG. 8). Example connected edge devices may be customers, clients, managing devices (e.g., servers), third parties (e.g., customers of an entity owning and/or operating the software distribution platform 1005). Example connected edge devices may operate in commercial and/or home automation environments. In some examples, a third party is a developer, a seller, and/or a licensor of software such as the example computer readable instructions 882 of FIG. 8. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example network 1000 of FIG. 10, the software distribution platform 1005 includes one or more servers and one or more storage devices. The storage devices store the computer readable instructions 882. The one or more servers of the example software distribution platform 1005 are in communication with a network 1010, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 882 from the software distribution platform 1005. For example, the software, which may correspond to the example computer readable instructions 882 of FIG. 8, may be downloaded to the example processor platform(s) 1000 (e.g., example connected edge devices), which is/are to execute the computer readable instructions 882 to implement the software instructions. In some examples, one or more servers of the software distribution platform 1005 are communicatively connected to one or more security domains and/or security devices through which requests and transmissions of the example computer readable instructions 882 must pass. In some examples, one or more servers of the software distribution platform 1002 periodically offer, transmit, and/or force updates to the software (e.g., the example computer readable instructions 882 of FIG. 8) to ensure improvements, patches, updates, etc. are distributed and applied to the software at the end user devices.

In the illustrated example of FIG. 10, the computer readable instructions 882 are stored on storage devices of the software distribution platform 1005 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 882 stored in the software distribution platform 1005 are in a first format when transmitted to the example processor platform(s) 1000. In some examples, the first format is an executable binary in which particular types of the processor platform(s) 1000 can execute. However, in some examples, the first format is uncompiled code that requires one or more preparation tasks to transform the first format to a second format to enable execution on the example processor platform(s) 1000. For instance, the receiving processor platform(s) 1000 may need to compile the computer readable instructions 882 in the first format to generate executable code in a second format that is capable of being executed on the processor platform(s) 1000. In still other examples, the first format is interpreted code that, upon reaching the processor platform(s) 1000, is interpreted by an interpreter to facilitate execution of instructions.

Machine Learning in Edge Computing Networks

Machine learning (ML) involves computer systems using algorithms and/or statistical models to perform specific task(s) without using explicit instructions, but instead relying on patterns and inferences. ML algorithms build mathematical model(s) (referred to as "ML models" or the like) based on sample data (referred to as "training data" or the like) in order to make predictions or decisions without being explicitly programmed to perform such tasks. ML algorithms perform a training process on a relatively large dataset to estimate an underlying ML model. Generally, an ML algorithm may refer to a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. In some cases, an ML model may include an artificial neural network (NN), which is based on a collection of connected nodes ("neurons") and each connection ("edges") transmit information (a "signal") from one node to other nodes. A neuron that receives a signal processes the signal using an activation function and then signals other neurons based on the processing. Neurons and edges typically have weights that adjust as learning proceeds. The weights may increase or decrease the strength of a signal at a connection.

Figure 11:
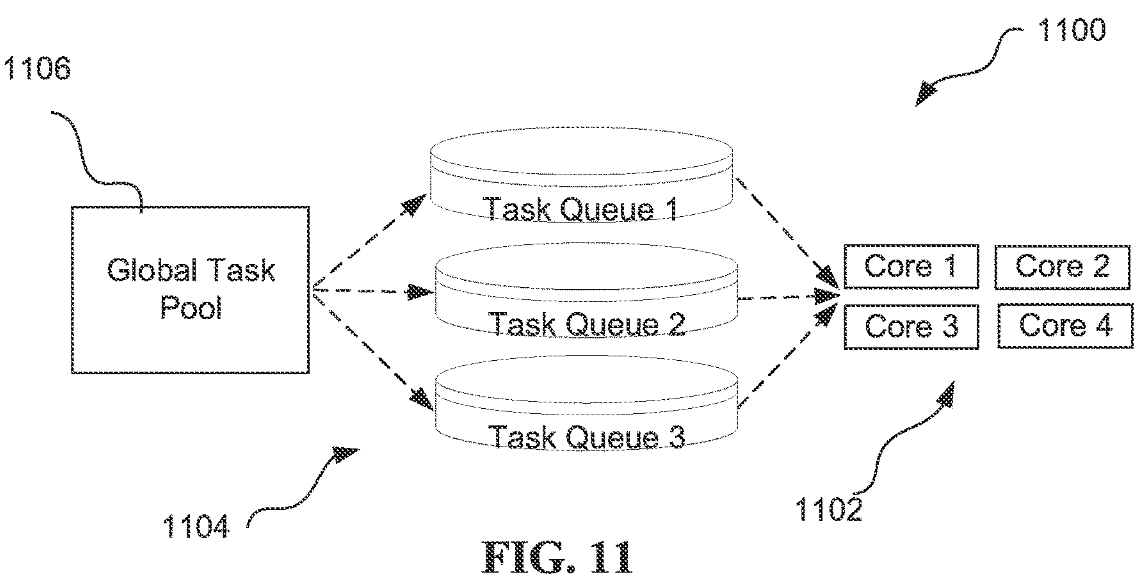
FIG. 11 illustrates a simplified processing flow for a state-of-the-art implementation that relies on a distributed task scheduler for scheduling various tasks in a multicore platform.

FIGS. 11-15 will now be described in the context of some embodiments. While FIG. 11 pertains to the state of the art, FIGS. 12-15 pertain to one or more example algorithms according to various embodiments. The algorithms according to embodiments may be deployed on an apparatus of a computing node, FIG. 11 shows a simplified processing flow 1100 for a state-of-the-art implementation that relies on a distributed task scheduler for scheduling various tasks in a multicore platform 1102, where each core runs its own scheduling and fetches tasks from a set of predefined task queues 1104, where the queues are generated in a predetermined manner from tasks in a global task pool 1106. While potentially scalable, the above state of the art solution has the following disadvantages. For example, because of complicated task dependencies characteristic in a system such as a 5G system, extending a distributed scheduling regime to new scenarios, for example to new platforms that include new base station configurations, will require hand-implementation of a new set of scheduling rules to be applied by each of the cores. In addition, a distributed system such as the one described above disadvantageously does not have an inherent capability to save energy, since cores cannot coordinate task allocation and scheduling among themselves.

Several relevant current works attempt to deal with solving combinatorial scheduling problems. The work in Bello et al., "Neural Combinatorial Optimization with Reinforcement Leaning," ICLR, 2017 (hereinafter "Bello") proposes a learning approach for solving combinatorial optimization problems, such as the traveling salesman problem. The work in D. Lo et al., "Heracles: Improving resource efficiency at scale," in *Proceedings of the 42nd Annual International Symposium on Computer Architecture,* 2015 (hereinafter "Lo") introduces an algorithm that is used to dynamically allocate resources to tasks based on their latency requirements, increasing overall resource utilization efficiency. Further, the work in R. Nishtala and et al. "Twig: Multi-Agent Task Management for Colocated Latency-Critical Cloud Services," in IEEE International Symposium on High Performance Computer Architecture (HPCA), 2020 (hereinafter "Nishtala") introduces a learning approach for ensuring high reliability scheduling that accounts for worst-case latencies in the form of packet drops.

However, one missing component from all previously mentioned solution to the problem of power savings in a low latency multicore environment is that they offer no inherent mechanism for taking task dependencies into account in an intelligent manner. The state of the art further does not take into account task latencies using information from a processing or execution of a task, instead of using indirect latency measures such as packet drop rates, etc. In addition, the degree of reliability required of a 5G BS in terms of its latency requirements is different from that required of a packet processing pipeline, where packet drops are expected even where they are to be minimized. In contrast, missing certain key deadlines could jeopardize the entire running of the cellular system if the timing is not met. No prior work explicitly optimizes for energy usage in multicore platforms in scenarios with multiple task dependencies with strict latency deadlines.

Embodiments provide two solutions to address the problem of optimization of energy usage in scenarios with multiple task dependencies with strict latency deadlines. Those embodiments will be described below.

According to a first embodiment, a heuristics-based first-fit first (FFF) algorithm is to sort available tasks in a predefined order, fetch them sequentially, and determine a first available core where the task can be allocated while meeting a target criterion. The most common criterion could be related to the latency of the task.

According to a second embodiment, a machine learning model is trained in conjunction with an idle state management model and a post-processing sorting engine, using reinforcement learning. A reward signal is used to enforce task deadlines, task dependencies and to thus reduce energy consumption in a multicore system.

Sorting according to some embodiments may include storing tasks in a memory, such as a cache or buffer of a computing device, before, after or during sorting.

RAN occupies a significant place in the market, and it is thus important to provide power savings mechanisms that further its implementation. Performance of a multicore platform may be measured on a joules/bit basis. Embodiments allow for dynamic task allocation among the cores in a multicore platform based on platform characteristics (e.g., number of cores, voltage, power draws) and the total number of tasks. Some embodiments provide significantly reduced energy consumption over long periods of time.

According to some embodiments, a power saving mechanism implements per-core sorting of tasks based on their dependencies on a post-processing basis. Some embodiments take into consideration the order of a task in an execution pipeline in allocating tasks to cores of a multicore platform. Some embodiments may be implemented centrally within a server or may be implemented in a distributed manner among various edge nodes, which edge nodes may include the cores of the multicore platform. Some embodiments provide machine learning (ML) based scheduling or intelligent scheduling for energy optimization where input features of the platform include at least task dependencies, and where the base station (BS) is configured with the ML-based scheduling information.

In the context of embodiments, a platform is provided with a number of N cores (or, more generally, processing threads). A global pool is further provided with K tasks that have to be allocated, where each task belongs to a particular task type. A "task type" may be characterized by at least one of: average execution time (under cold/warm cache conditions), latency deadline $T_i$ (where i denotes the task number i from the total number N of tasks) and a set (potentially empty) of predecessor task types that must be executed before the current task can be started. The global pool can contain multiple tasks from the same task type (e.g., 60 total tasks, distributed among four task types).

A task allocation may be characterized through a binary allocation matrix X of size K×N and the integer-valued P of the same size, where X indicates the core allocated to each task be scheduled, while P indicates the execution order of the set of tasks on each core to which tasks are allocated Some embodiments aim to solve the following constrained minimization problem:

$$\min_{X,P} E(X) \quad \text{Eq. (1)}$$

$$\text{s.t.} \quad \text{all task deadlines are met}$$

$$\text{all task dependencies are met}$$

In Equation (1), the function E(X) characterizes the energy consumption of the system for a given allocation X. Equation (1) provides an explicit function of the way tasks are scheduled on cores, since it directly affects how much power saving time is left on a core, and thus what power states it can enter in order to reduce energy usage.

The state of the art offers solutions that only partially address three criteria on which some embodiments are based, namely energy, latency deadline and task dependencies. Current solutions do not cover the energy objective in an adaptive way and would require essentially a brute force approach to achieve power savings in a multicore environment, which does not scale to real scenarios. In addition, some current solutions are designed to accommodate latency constraints and power savings but cannot handle the complex task dependencies present in 5G workloads.

First Embodiment: First-Fit First (FFF) Algorithm

Figure 12:
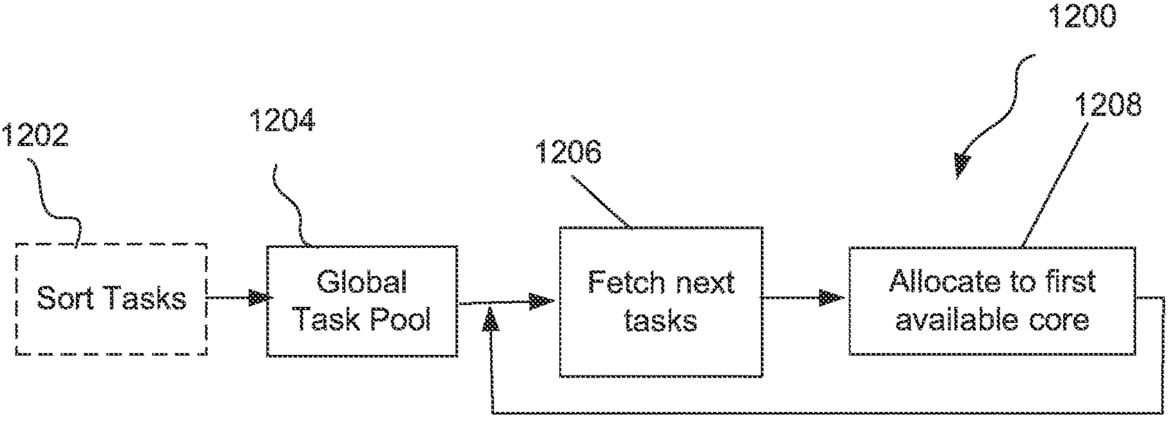
FIG. 12 is a block diagram of a First-Fit-First solution according to a first embodiment.

FIG. 12 shows a block diagram 1200 for a FFF algorithm flow according to a first embodiment. The FFF algorithm includes, at operation 1202, a pre-processing stage where tasks to be scheduled for execution are sorted according to one or more criteria. For example, the tasks may be sorted in ascending order based on their latency deadlines first, and, within sets of tasks of a same latency deadline, sorted next based on their average latency cost, the sorted tasks being stored at operation 1204 to a pool of sorted unallocated tasks. At operation 1206, the FFF algorithm includes fetching the tasks based on their sorting order from the pool or sorted unallocated tasks. Operation 1204 for example includes fetching the tasks from the pool of sorted unallocated tasks one by one according to their sorting order. Operation 1208 includes allocating each task to a first core found to be available for the each task based on a core availability criterion. By way of example, an availability criterion for a candidate core for a given task may include whether the worst-case latency cost of the given task (such as the 99th percentile value of the latency cost of the given task) fits within the remaining latency budget of the core. The latter criterion considers other tasks already allocated to the candidate core. The above flow may start with the first task from the pool of sorted unallocated tasks based on sorting order and continue on recursively until the last task of the pool of sorted unallocated tasks is reached and allocated.

An FFF algorithm according to a first embodiment, an example of which is described above in the context of FIG. 12, is simple to implement and efficient at finding energy-saving solutions. The first embodiment requires advance knowledge of the statistical parameters (such as mean and standard deviation) of task execution times. Thus, where two tasks have dependencies, the two tasks are combined into a single block with a combined processing cost of the individual tasks in the dependency list, thus making the block size larger and requiring a scheduling a larger task block over the cores. The FFF algorithm of the first embodiment further constrains this algorithm to always schedule tasks within a dependency chain on the same core. The above could further introduce greater complexities if the task dependency chains exceed the processing budget of a single core, effectively serializing the workload instead of allowing for parallel executions. In addition, obtaining task execution times in a manner that reflects all the possible task execution times may require extensive profiling and may require a rather high level of overprovisioning for worst-case scenarios.

Second Embodiment: Deep RL for Task Allocation

Figure 13A:
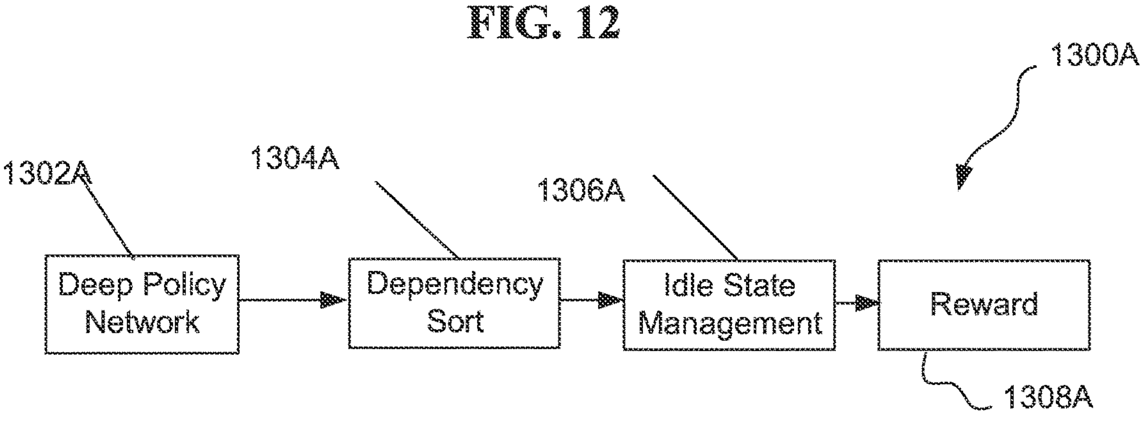
FIG. 13A is a block diagram of a reinforcement learning solution according to a second embodiment.

A high-level block-diagram 1300A of a second embodiment involving deep reinforcement learning (RL) for task is shown in FIG. 13A. The second embodiment pertains to a deep reinforcement learning approach, where a trainable model learns from experience (simulated or in-deployment). The second embodiment includes operations as shown in FIG. 13A. In the second embodiment, at operation 1302A, a trainable model in the form of a deep policy network that serves as a reinforcement learning agent learns to predict the allocation of the next task on the next core (that is, learns to predict which core the next task is to be allocated to), given the remaining tasks to be scheduled and the already scheduled ones on each core. Next, at operation 1304A, a sorting module takes the complete scheduling solution output by the agent and sorts the tasks on each core based on their latency deadline and order (including dependency) in the task execution pipeline. Then, at operation 1306A, an idle state management module, given a candidate scheduling allocation, determines, for individual ones of allocated cores, respective power states and corresponding durations of the respective power states. At operation 1306A, the idle state management module, based on the power states and durations mentioned above estimates the total energy used by each allocated core. At operation 1308A, the algorithm generates a reward signal that is used to train the model in an end-to-end fashion. The reinforcement learning (RL) agent will now be described in more detail below.

Reinforcement Learning (RL) Agent (Model)

The model implemented could be instantiated as a software implementation and has two distinct regimes: training and inference.

During training, for example as shown in the context of operation 1302A, the model takes as its input the number of available and already scheduled tasks of each type, including the number of those tasks allocated to each core (for the already scheduled tasks). This consists of the current state of the environment.

The current state of the environment is indicated by the number of allocated and unallocated tasks in the system, per type. The action is what task is to be allocated to which core for execution The allocation of the tasks may be described by two matrices, we mention this using parameters X and P, where X is of size K×N (for K tasks and N cores) and gives the allocation of which task on which core and P also of size K×N, gives the order of the allocation of each task on a given core.

The model which could be a neural network model such as Multilayer Perceptron (MLP) model or a Convolutional Neural Network (CNN) model, then predicts a row-stochastic matrix of probabilities with the entries representing the probability of assigning a specific task type (x) to a specific core (y). If certain task types are no longer present in the pool of tasks to be scheduled, then the corresponding actions are considered invalid. The operation then involves sampling the next allocation according to the predicted distribution, incrementing the environment state accordingly, and receiving a reward.

Figure 13B:
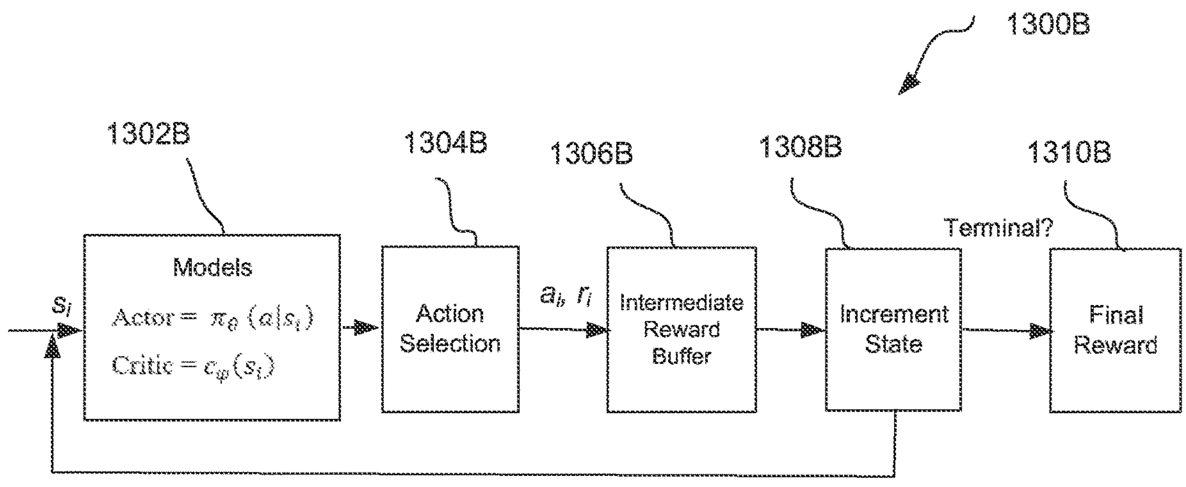
FIG. 13B is a block diagram showing an alternate depiction of the reinforcement learning solution of FIG. 13A according to the second embodiment.

Reference is now made to FIG. 13B, which shows a flow 1300A that is a modified depiction of the flow 1300A of FIG. 13A, showing an embodiment of an algorithm that could be used to determine probabilities according to the second embodiment. In flow 1300B, operations 1302B and 1304B correspond to operation 1302A of FIG. 13A, and, in the particular example of FIG. 1B, involve the implementation of an actor/critic model (A2C) which takes as its input the number of allocated and unallocated tasks, as will be described below. See A2C—Stable Baselines 2.10.2 documentation (stable-baselines.readthedocs.io) (hereinafter A2C). See also Mnih et al., "*Asynchronous Methods for Deep Reinforcement Learning*," arXiv:1602.01783v2 [cs.LG] 16 Jun. 2016 (hereinafter A3C). The A2C model is a synchronous and deterministic version of A2C, and involves using the model at operation 1302B by setting the Actor and the Critic respectively as shown in Equations (3) and (4) below:

$$\text{Actor} = \pi_\theta(a \mid s_i) \quad \text{Eq. (2)}$$

$$\text{Critic} = c_\varphi(s_i) \quad \text{Eq. (3)}$$

where:

- $\pi_\theta$ $(a|s_i)$ decides what action is to be taken;
- $\pi$ corresponds to the policy to map a state s to an action a;
- a corresponds to an action, which involves assigning a task to a core;
- $s_i$ is the ith state, where we are trying to allocate the ith task on the jth core;
- $\theta$ corresponds to parameters of the model being used, which can be updated; and
- $c_\varphi(s_i)$ evaluates the action for a given state.

An Actor/Critic algorithm may be used as set forth in operations 1302B and 1304B according to some examples to get next stage probabilities and to train models by maximizing the rewards until a final reward is reached, which is determined all the tasks have been allocated.

The choice of a prediction algorithm according to some embodiments is not limited to any actor-critic approach, an example of which is outlined above, but may be influenced by goals of the model and/or by architectural goals given the requirements for system optimization. Thus, algorithms other than an actor-critic algorithm may be used to make predictions as would be recognized by a skilled person.

The model returns an action, which includes assigning a task of a certain type to a core. According to the second embodiment, the model then evaluates if this action is valid, that is, whether assigning a given task to core j did not exceed the deadline for that task, and/or did not violate any dependencies. Rewards can then be assigned based on Equation (4) below at operations 1306B (for the training phase) and 1310B (for the post training or inference phase), with operation 1308B incrementing the state therebetween. For each task that is assigned to a core, if a latency deadline is missed by a certain factor, some embodiments contemplate storing a log of instances where the missed deadline is greater than all previous missed deadlines. In such a case, a value corresponding to the extent of the miss may be incorporated into calculation of the reward. After all the tasks are assigned to the cores, we then estimate the total reward Ri.

Figure 14:
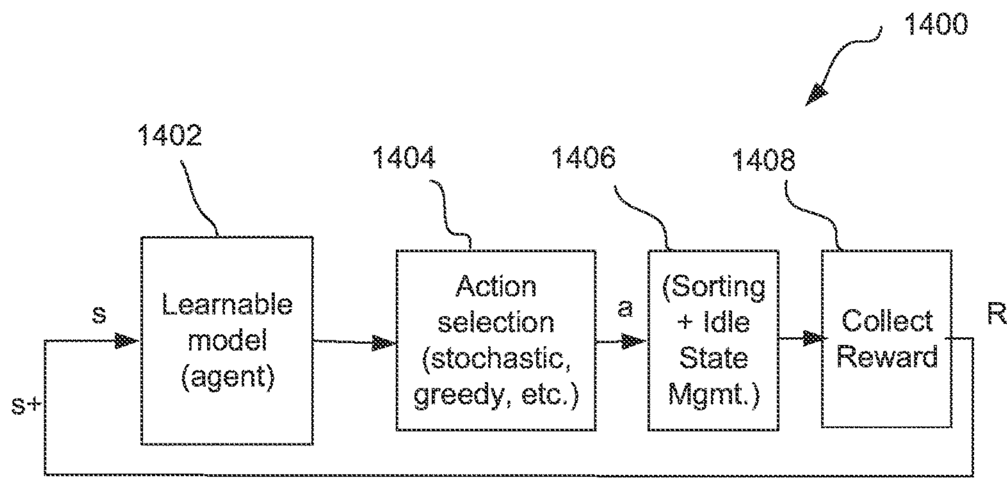
FIG. 14 is another block diagram showing another alternate depiction of the reinforcement learning solution of FIGS. 13A and 13B according to the second embodiment.

The recursive part of the second embodiment during training is shown in further detail in the flow or process 1400 of FIG. 14. This recursive process of the second embodiment continues until all tasks have been allocated, or until it is clear that the model is not going to converge i.e. there is no trajectory to be found where we can perform task allocation within the given task deadline. Sequential task allocations using the model, as shown in the context of operations 1402 and 1404, which together correspond to operation 1302A of FIG. 13A, may be used for training purposes only and serves as a way to obtain useful gradient information with respect to movement "along" an allocation trajectory, which can later be used during the inference phase. During inference, at operation 1404, an initial state is fed to the model, and the allocation trajectory is created by either stochastically or greedily (by picking the most likely action at each step) inferring such allocation trajectory in the same manner as was done during training. Reference will now be made more particular to operations 1304A and 1306A of FIG. 13A, corresponding to operation 1406 of FIG. 14, and further to operations 1308A and 1408 of FIGS. 13 and 14, respectively.

Sorting Module

The second embodiment includes, as per operations 1304A of FIG. 13A and 1406 of FIG. 14, sorting the tasks scheduled on each core separately, in ascending order of their position in the task execution pipelines. The sorting is carried out separately for each set of tasks with the same latency deadline on each core. This comes from the insight that, if we swap the execution order of two tasks on the same core, with the same task deadline, then the swapped solution will still satisfy the latency deadline and have the same energy consumption, but only one of the two cases may satisfy the dependency between tasks. Extending this observation to M tasks, it follows that any permutation of the tasks can be a valid solution in terms of latency and energy usage. Thus, sorting is used as a module that builds on optimization based on latency and energy usage, by also returning a permutation of task allocations which has a valid task dependency. Dependency sorting effectively "helps" the algorithm by obviating a responsibility on its part of respecting task dependencies, leading to a much efficient training process, as will be discussed in the results below.

By way of example, a neural network according to an example of the second embodiment may output a trajectory based on three different task types (denoted by 0, 1 and 2), ten tasks and five cores. An example output may include: [(1 2 0), (2 0 2), (0 3 0), (0 0 0), (0 0 0)], where each set of three numbers in parentheses represents an allocation of a task of one of the three different task types on that core. More particularly, core 1 (first parenthesis) has one task of type 1, and two tasks of type 2 and zero tasks of type 3 allocated to it. From the above, we can see that, of the ten tasks, three are of type 1, five are of type 2, and two are of type 3. We can also see that cores 4 and 5 have zero task assigned to them.

Another vector gives us the order of execution of the tasks on each core in multiple steps in terms of task types, i.e. {1 0 2} means on core 1, first we execute 1 task of type 1, then one task of type 0, then one task of type 2 and so on.

For dependencies, the algorithm may use an encoding of a dependency vector such that if we have 3 task types, a dependency length and a dependency parent are generated as will be described further below.

The dependency length parameter indicates whether a given task type has a dependency based on any other task type. The value 0 for the dependency length may be used to mean that no dependencies exist, where a value larger than zero indicates the number of task types that the given task type depends on.

The dependency parent parameter indicates which other task type must be executed before a given task type is executed. An example algorithm may include code that supports only one dependency for each task type, meaning, task type 1 may not execute before task type 2, task type 2 may not execute before task type 3 etc., as set forth in the code provided below:

```
{'dependency_length': np.asarray ([0, 1, 0], dtype = np.int).
'dependency_parent': np.asarray[-1, 0, 1], dtype = np.int)]}
```

For dependency sorting, an example may include taking the order of task execution for each core as given by a neural network, and testing to determine whether that order meets the dependency criteria. For example, if the order of task execution prior to sorting is {1 0 2} meets dependency criteria, the algorithm would preserve that order during sorting, knowing that the order can be executed on a core and meet latency deadlines as well (since this is already taken into account in the initial order {1 0 2}. Sorting would need to evaluate sorting the execution order such that {1 0 2} can also meet the dependency criteria (i.e. for example, if task type 0 should always be scheduled after scheduling task type 2, then we exchange their ordering during sorting).

Idle State Management Module

The second embodiment includes, as per operations 1306A of FIG. 13A and 1406 of FIG. 14, a module that takes as input the sorted solution, and, if all the task deadlines and dependencies are met, estimates or collects measurements related to the energy consumed by each core, $E_i$.

In the case of on-device deployment, these measurements can be collected by monitoring the power states (e.g. C-states) of each core at a sufficiently fine granularity, after which the total energy at the core for executing the tasks scheduled on that core can be estimated. For example, any utility such as powerstat could be used if the granularity offered is sufficiently small to produce reliable estimates.

If the model is pretrained using simulated data, then the idle state management module may determine the lowest possible power state each core can enter, given the current tasks that are scheduled on that core. Where minimum residence and exit latency requirements for C-states on certain processors, some cores may not be able to enter deep sleep, or only enter it for a short period of time.

Reward Signal

The second embodiment includes, as per operations 1308A of FIG. 13A and 1408 of FIG. 14, a module that is to determine two main types of rewards: intermediate (where all tasks have not yet been allocated) and final. The rewards are issued based on a partial or based on a final scheduling allocation, respectively.

Equation (4) below provides value for a reward R for a final value:

$$R = \begin{cases} \min_{i,k} 1 - \frac{TC_i}{T_{k,i}}, & \text{if at least one task overflows} \\ -1, & \text{if at least one task does not meet dependency} \\ 1, & \text{if latency and dependency are met, but tasks still available} \\ \beta * \left(1 - \frac{\Sigma_i E_i}{E_{max}} + \lambda * \frac{N_e}{N}\right) & \text{if latency and dependency are met, end of allocation} \end{cases} \quad \text{Eq. (4)}$$

where:

i denotes a task number;

k denotes task type;

$T_{Ci}$ is the completion time of the ith task; and $T_{ki}$ is a latency deadline of the ith task;

β is a final reward amplification factor;

$E_i$ denotes the energy to be consumed by cores for all tasks i if tasks i were deployed on the cores;

$E_{max}$ denotes the energy to be consumed by all cores at full load;

λ is an optional factor (i.e. may be equal to 1) which corresponds to an empty core reward factor;

Ne is the number of completely empty cores; and

N is the number of cores.

Note that, according to the example of Equation (4), only the final reward (where latency and dependency are met at end of allocation) concerns energy usage and is determined only if the latency and dependency deadlines are met for the entire trajectory. Also note that a negative reward may be received if any task either overflows its latency deadline or is allocated for execution in a manner that does not respect its dependencies. In addition, a soft reward $$\left(\min_{i,k} 1 - \frac{TC_i}{T_{k,i}}\right)$$

informing the agent during training (hence as an intermediate reward) by how much a task overflows may be applied in the case of a task that has overflowed.

During training and deployment, a goal of the algorithm or agent according to the second embodiment is to maximize the collected reward along the task allocation trajectory. To achieve this goal effectively, the agent may need to: meet all task deadlines at all points along the trajectory; meet all task dependencies at the end of the trajectory; reduce the consumed energy at the end of the trajectory; and optionally as controlled by λ, maximize the number of completely empty (unallocated to the tasks that are being allocated) cores $N_e$.

According to the second embodiment, a successful training procedure ensures that the above criteria are met not only during training, but also during inference. The values β and λ serve as hyper-parameters for the energy-saving component of the loss and control the magnitude of this reward, and an extra reward for leaving cores completely empty (thus allowing them to enter deep sleep), respectively.

Figure 16:
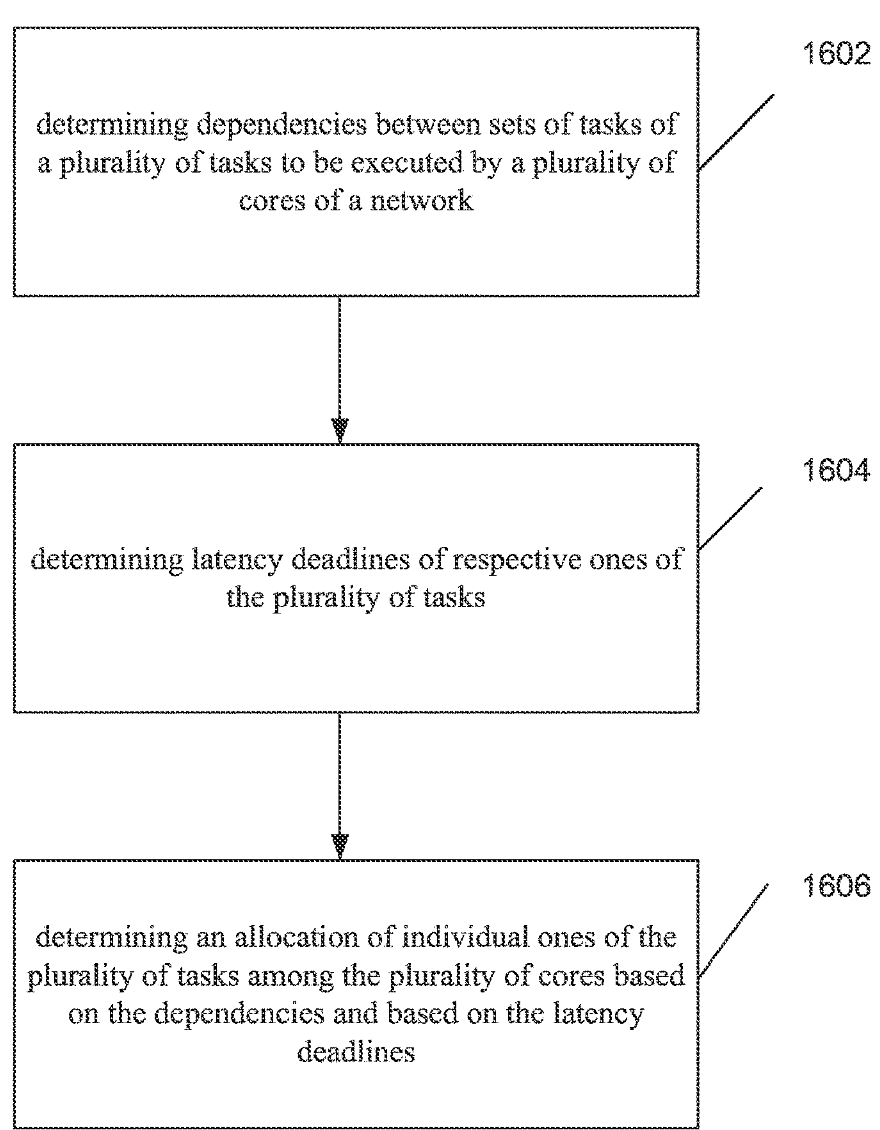
FIG. 16 illustrates a process according to an embodiment.

Reference now is made to FIG. 16, which shows an embodiment of a process 1600 according to some embodiments. At operation 1602, process 1600 includes determining dependencies between sets of tasks of a plurality of tasks to be executed by a plurality of cores of a network. At operation 1604, process 1600 includes determining latency deadlines of respective ones of the plurality of tasks. At operation 1606, process 1600 includes determining an allocation of individual ones of the plurality of tasks among the plurality of cores based on the dependencies and based on the latency deadlines.

Results

Impact of Sorting on RL Algorithm

Figure 15:
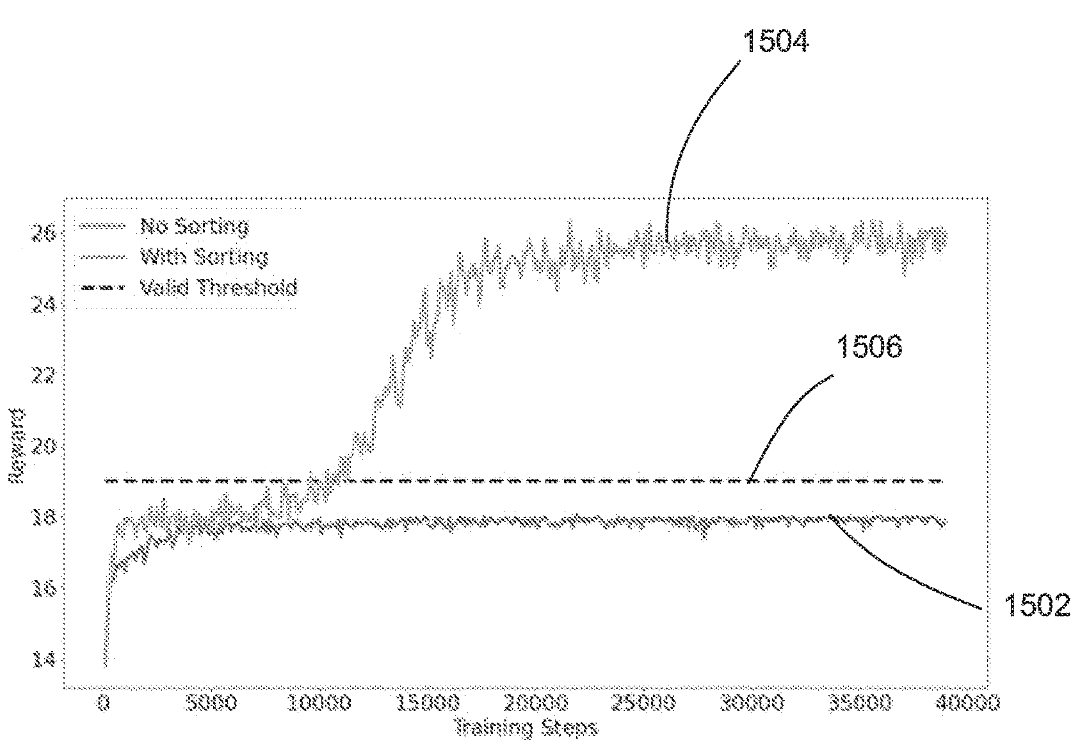
FIG. 15 illustrates a graph showing performance curves plotting reward against number of training steps for a state of the art mechanism and for a solution according to some embodiments.

Results shows the importance of the sorting module described above in the context of operations 1304A of FIG. 13A and 1406 of FIG. 14 in the training process. FIG. 15 shows a graph 1500 depicting training curves 1502 and 1504 plotting reward against number of training steps for a given architecture, trained on a same scenario (10 cores and 20 tasks to be scheduled/allocated), with the only difference being the absence of the sorting module (curve 1502) and the presence of the sorting module (curve 1504). FIG. 15 shows the impact of sorting based on task dependencies on the end-to-end training performance of a reinforcement learning model. The x-axis represents the progression in training. The y-axis represents the received reward—with higher rewards being better. The dashed black line 1506 represents the threshold for which the model is able to learn a solution that satisfies all latency deadlines and dependencies.

Without the dependency sorting module included, as shown by curve 1502, the reward signal does not vary appreciably after about 5000 training steps, even at the final reward value, and never crosses the threshold for which the model is able to learn a solution that satisfies not only latency deadlines but also dependencies. Without the sorting module, the model has to learn to schedule tasks in the order of their dependencies discretely on each individual core, while still meeting the deadline. When sorting is included, the model successfully trains, and can further learn to achieve a reward higher than the dashed line, indicating it has received rewards for saving energy as well as for meeting latency deadlines and dependency requirements. While it may be possible that sorting is learned by very large and complex models, we conclude that sorting may be an effective component in efficiently learning a solution to the dependency-constrained task allocation problem.

Performance Results

Table 1 quantifies the performance of the proposed invention in a varying number of scenarios, with different numbers of available cores and number of total tasks (total load) to be scheduled. In all cases, the model is able to learn a solution that meets all task deadlines and satisfies all dependencies. To simulate idle state management, we consider the thermal design power (TDP) of an Intel Xeon Gold 6256 processor as power draw during the active state, and two possible idle states, C1 and C6, with a power draw of 70% and 30% of the active state, respectively. Furthermore, in order to be able to enter C1 or C6, the cores must have a headroom of four times 3 and 40 microseconds, respectively (with this headroom including the exit latency, as well as realistic values for the minimum residency requirements enforced by the power manager on the platform).

Table 1 shows performance results of example embodiments in four different scenarios. In each case, a separate model is trained and tested on the corresponding scenario. Consumed energy ("[%] of 'No Idle'") is measured as a percentage of a baseline ("No Idle") that runs all cores in the active state, for the entire duration of the subframe ++++ associated with the tasks to be allocated (in the case of mixed deadlines—largest deadline).

TABLE 1

| Num. Cores | Num. Tasks | Total Task Cost [μs] | No Idle [mJ] | Deep RL [%] of "No Idle" | Deep RL Cores | FFF [%] of "No Idle" | FFF [cores] |
|---|---|---|---|---|---|---|---|
| 10 | 20 | 1800 | 1025 | 60.2 | 4 | 61.5 | 5 |
| 10 | 30 | 2700 | 1025 | 73.6 | 7 | 74.2 | 7 |
| 16 | 40 | 3600 | 1640 | 66.9 | 12 | 67.9 | 9 |
| 16 | 50 | 3190 | 1640 | 63 | 14 | 63.5 | 8 |

Table 1 shows that both the first embodiment (FFF) and the second embodiment (RL method) can save almost up to 40% of the consumed energy in certain scenarios, and at least 27% for all considered scenarios, with the RL method consistently outperforming the FFF algorithm. Furthermore, the number of utilized cores is also lower than the maximum number of cores on the platform for both algorithms, but with different types of behaviors (FFF usually consumes fewer cores, at a slightly increased overall energy cost), which allows for flexible utilization of either algorithm depending on the use case.

EXAMPLES

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

As referred to below, an "apparatus of" a computing node is meant to refer to a "component' of "node," such as of a central node, central server, server, client node, client computing node, client device, client or user, as the component is defined above. A client, client node, or client compute/computing node may refer to an edge computing node that is serving as a client device and, in the examples below, may perform training of a global model using local data, which the client may wish to keep private (e.g., from other nodes). The "apparatus" as referred to herein may refer, for example, to a processor such as processor 752 of edge computing node 750 FIG. 7B, for example along with any other components of the edge computing node 750 of FIG. 7B, or, for example to circuitry corresponding to a computing node 515 or 523 with virtualized processing capabilities as described in FIG. 5.

Example 1 includes an apparatus of a computing node of a network, the apparatus comprising an interconnect interface to connect the apparatus to one or more components of the computing node, and a processor to: determine dependencies between sets of tasks of a plurality of tasks to be executed by a plurality of cores of the network; determine latency deadlines of respective ones of the plurality of tasks; and determine an allocation of individual ones of the plurality of among the plurality of cores for execution based on the dependencies and based on the latency deadlines.

Example 2 includes the subject matter of Example 1, the processor to: sort the plurality of tasks based on the dependencies between the sets of tasks and based on the latency deadlines; and after sorting, store the plurality of tasks in a pool of sorted unallocated tasks, wherein the processor is to determine the allocation by: fetching each of the tasks based on a sorting order thereof in the pool of sorted unallocated tasks; determining a next available core of the plurality of cores based on one or more core availability criteria; determining an allocation of the each of the tasks to the next available core; and repeating fetching, determining the next available core, and determining an allocation of the each of the tasks until at least one set of the plurality of tasks have been allocated.

Example 3 includes the subject matter of Example 2, wherein the processor is to sort the plurality of tasks first in ascending order based on latency deadlines of the tasks, and, within tasks of a same latency deadline, based on average latency cost.

Example 4 includes the subject matter of Example 2, wherein the processor is to sort the plurality of tasks by grouping the sets of tasks with dependencies into respective single blocks of tasks, and wherein, for tasks with dependencies, determining the allocation of the each of the tasks includes determining an allocation of the each of the single blocks of tasks.

Example 5 includes the subject matter of Example 2, wherein the one or more core availability criteria include whether a worst-case latency cost of the each of the tasks fits within a remaining latency budget of a candidate core of the plurality of cores being evaluated to be the next available core.

Example 6 includes the subject matter of Example 1, wherein the processors are to determine an allocation of individual ones of the plurality of tasks among the plurality of cores to generate an allocation X of the plurality of tasks to the plurality of cores, allocation X being determined based on a minimal energy consumption of the plurality of cores of the network.

Example 7 includes the subject matter of Example 1, wherein the processor is to determine an allocation of individual ones of the plurality of tasks among the plurality of cores by using a reinforcement learning (RL) model to: determine a set of allocations to generate a suggested allocation of the plurality of tasks to the plurality of cores, wherein determination of each individual allocation of the set of allocations comprises: determining a predicted allocation of a task of the plurality of tasks on a next available one of the plurality of cores based on remaining tasks of the plurality of tasks to be allocated; for the next available one of the plurality of cores: sorting corresponding tasks in the predicted allocation based on their latency deadlines and based on their dependencies; estimating a total energy to be used by the next available one of the plurality of cores in an execution of the corresponding tasks; and generate a final reward value for the suggested allocation in response to a determination that dependencies between the sets of tasks and the latencies of the respective ones of the plurality of tasks have been satisfied.

Example 8 includes the subject matter of Example 7, wherein the processor is to use a reinforcement learning (RL) model to generate an intermediate reward value for one or more individual allocations of the set of allocations during a training phase of the RL model, the intermediate reward value based on a determination that at least one tasks in the one or more individual allocations is to overflow, a determination that an execution of at least one task in the one or more individual allocation is to fail to satisfy a dependency between the sets of tasks, or a determination that at least one task remains unallocated.

Example 9 includes the subject matter of Example 8, wherein the processor is to, during the training phase, determine the allocation of the individual ones of the plurality of tasks by recursively determining training allocations of individual ones of the plurality of tasks, wherein each successive recursion is to be based on a higher intermediate reward value than a prior recursion.

Example 10 includes the subject matter of Example 8, wherein the processor is to generate the intermediate reward by at least one of: in response to a determination that a task in the one or more individual allocations is to overflow, generate the intermediate reward value to be based on a ratio of a completion time of the task that is to overflow and a latency deadline of the task that is to overflow; or in response to a determination that at least one task remains unallocated, generate the intermediate value to equal a positive value.

Example 11 includes the subject matter of Example 10, wherein the intermediate reward value based on the ratio of the completion time of the task that is to overflow and the latency deadline of the task that is to overflow corresponds to $$\min_{i,k} 1 - \frac{TC_i}{T_{k,i}},$$

where i denotes a task number of the task that is to overflow, k denotes task type, $T_{Ci}$ is the completion time and $T_{ki}$ is the latency deadline.

Example 12 includes the subject matter of Example 10, wherein the positive value is equal to 1.

Example 13 includes the subject matter of Example 7, wherein the final reward value is based on a sum of all energy $E_i$ consumed by the plurality of cores for all tasks i of the plurality of tasks if all tasks i were to be executed.

Example 14 includes the subject matter of Example 13, wherein the final reward value is based on the sum of all energy $E_i$ divided by $E_{max}$, with $E_{max}$ denoting energy consumed by the plurality of cores at full load.

Example 15 includes the subject matter of Example 14, wherein the final reward value is further based on a ratio of a number Ne of empty cores and a total number N of the plurality of cores.

Example 16 includes the subject matter of Example 15, wherein the final reward value is given by $$\beta * \left(1 - \frac{\Sigma_i E_i}{E_{max}} + \lambda * \frac{N_e}{N}\right),$$

where i denotes a task number within the plurality of tasks, β is a final reward amplification factor, and λ is a factor that corresponds to an empty core reward factor.

Example 17 includes the subject matter of Example 7, wherein, for the next available one of the plurality of cores, sorting the corresponding tasks in the predicted allocation includes first sorting the corresponding tasks in the predicted allocation by latency deadlines thereof, and then, within each group of tasks of a same latency deadline, sorting the corresponding tasks based on their dependencies.

Example 18 includes the subject matter of Example 7, wherein, for the next available one of the plurality of cores, sorting the corresponding tasks in the predicted allocation based on the dependencies includes using an encoding of a dependency vector that includes a dependency length parameter to indicate whether a given task type has a dependency based on any other task type, and a dependency parent parameter that indicates which other task type must be executed before a given task type is executed.

Example 19 includes the subject matter of any one of Examples 1-18, wherein the apparatus further comprises a transceiver to provide wireless communication between the apparatus and other edge computing nodes of the network.

Example 20 includes one or more computer readable media comprising instructions that, when executed by a machine, are to cause the machine to perform operations including: determining dependencies between sets of tasks of a plurality of tasks to be executed by a plurality of cores of a network; determining latency deadlines of respective ones of the plurality of tasks; and determining an allocation of individual ones of the plurality of among the plurality of cores for execution based on the dependencies and based on the latency deadlines.

Example 21 includes the subject matter of Example 20, the operations further including: sorting the plurality of tasks based on the dependencies between the sets of tasks and based on the latency deadlines; and after sorting, storing the plurality of tasks in a pool of sorted unallocated tasks, wherein the processor is to determine the allocation by: fetching each of the tasks based on a sorting order thereof in the pool of sorted unallocated tasks; determining a next available core of the plurality of cores based on one or more core availability criteria; determining an allocation of the each of the tasks to the next available core; and repeating fetching, determining the next available core, and determining an allocation of the each of the tasks until at least one set of the plurality of tasks have been allocated.

Example 22 includes the subject matter of Example 21, wherein sorting includes sorting the plurality of tasks first in ascending order based on latency deadlines of the tasks, and, within tasks of a same latency deadline, based on average latency cost.

Example 23 includes the subject matter of Example 21, wherein sorting includes sorting the plurality of tasks by grouping the sets of tasks with dependencies into respective single blocks of tasks, and wherein, for tasks with dependencies, determining the allocation of the each of the tasks includes determining an allocation of the each of the single blocks of tasks.

Example 24 includes the subject matter of Example 21, wherein the one or more core availability criteria include whether a worst-case latency cost of the each of the tasks fits within a remaining latency budget of a candidate core of the plurality of cores being evaluated to be the next available core.

Example 25 includes the subject matter of Example 20, determining the allocation of individual ones of the plurality of tasks among the plurality of cores includes generating an allocation X of the plurality of tasks to the plurality of cores, allocation X being determined based on a minimal energy consumption of the plurality of cores of the network.

Example 26 includes the subject matter of Example 20, the operations including determining an allocation of individual ones of the plurality of tasks among the plurality of cores by using a reinforcement learning (RL) model to: determine a set of allocations to generate a suggested allocation of the plurality of tasks to the plurality of cores, wherein determination of each individual allocation of the set of allocations comprises: determining a predicted allocation of a task of the plurality of tasks on a next available one of the plurality of cores based on remaining tasks of the plurality of tasks to be allocated; for the next available one of the plurality of cores: sorting corresponding tasks in the predicted allocation based on their latency deadlines and based on their dependencies; estimating a total energy to be used by the next available one of the plurality of cores in an execution of the corresponding tasks; and generate a final reward value for the suggested allocation in response to a determination that dependencies between the sets of tasks and the latencies of the respective ones of the plurality of tasks have been satisfied.

Example 27 includes the subject matter of Example 26, the operations further including using a reinforcement learning (RL) model to generate an intermediate reward value for one or more individual allocations of the set of allocations during a training phase of the RL model, the intermediate reward value based on a determination that at least one tasks in the one or more individual allocations is to overflow, or a determination that at least one task remains unallocated.

Example 28 includes the subject matter of Example 27, the operations further including, during the training phase, determining the allocation of the individual ones of the plurality of tasks by recursively determining training allocations of individual ones of the plurality of tasks, wherein each successive recursion is to be based on a higher intermediate reward value than a prior recursion.

Example 29 includes the subject matter of Example 27, the operations further including generating the intermediate reward by at least one of: in response to a determination that a task in the one or more individual allocations is to overflow, generate the intermediate reward value to be based on a ratio of a completion time of the task that is to overflow and a latency deadline of the task that is to overflow; or in response to a determination that at least one task remains unallocated, generate the intermediate value to equal a positive value.

Example 30 includes the subject matter of Example 29, wherein the intermediate reward value based on the ratio of the completion time of the task that is to overflow and the latency deadline of the task that is to overflow corresponds to $$\min_{i,k} 1 - \frac{TC_i}{T_{k,i}},$$

where i denotes a task number of the task that is to overflow, k denotes task type, $T_{Ci}$ is the completion time and $T_{ki}$ is the latency deadline.

Example 31 includes the subject matter of Example 29, wherein the positive value is equal to 1.

Example 32 includes the subject matter of Example 26, wherein the final reward value is based on a sum of all energy $E_i$ consumed by the plurality of cores for all tasks i of the plurality of tasks if all tasks i were to be executed.

Example 33 includes the subject matter of Example 32, wherein the final reward value is based on the sum of all energy $E_i$ divided by $E_{max}$, with $E_{max}$ denoting energy consumed by the plurality of cores at full load.

Example 34 includes the subject matter of Example 33, wherein the final reward value is further based on a ratio of a number Ne of empty cores and a total number N of the plurality of cores.

Example 35 includes the subject matter of Example 34, wherein the final reward value is given by $$\beta * \left(1 - \frac{\Sigma_i E_i}{E_{max}} + \lambda * \frac{N_e}{N}\right),$$

where i denotes a task number within the plurality of tasks, β is a final reward amplification factor, and λ is a factor that corresponds to an empty core reward factor.

Example 36 includes the subject matter of Example 26, wherein, for the next available one of the plurality of cores, sorting the corresponding tasks in the predicted allocation includes first sorting the corresponding tasks in the predicted allocation by latency deadlines thereof, and then, within each group of tasks of a same latency deadline, sorting the corresponding tasks based on their dependencies.

Example 37 includes the subject matter of Example 26, wherein, for the next available one of the plurality of cores, sorting the corresponding tasks in the predicted allocation based on the dependencies includes using an encoding of a dependency vector that includes a dependency length parameter to indicate whether a given task type has a dependency based on any other task type, and a dependency parent parameter that indicates which other task type must be executed before a given task type is executed.

Example 38 includes a distributed edge computing system comprising: a central server; a plurality of computing nodes communicably coupled to the central server, at least one of the computing nodes including one or more processors and instructions that, when executed by the one or more processors, cause the at least one of the computing nodes to perform operations including: determining dependencies between sets of tasks of a plurality of tasks to be executed by a plurality of cores of the system; determining latency deadlines of respective ones of the plurality of tasks; and determining an allocation of individual ones of the plurality of among the plurality of cores for execution based on the dependencies and based on the latency deadlines.

Example 39 includes the subject matter of Example 38, the operations further including: sorting the plurality of tasks based on the dependencies between the sets of tasks and based on the latency deadlines; and after sorting, storing the plurality of tasks in a pool of sorted unallocated tasks, wherein the processor is to determine the allocation by: fetching each of the tasks based on a sorting order thereof in the pool of sorted unallocated tasks; determining a next available core of the plurality of cores based on one or more core availability criteria; determining an allocation of the each of the tasks to the next available core; and repeating fetching, determining the next available core, and determining an allocation of the each of the tasks until at least one set of the plurality of tasks have been allocated.

Example 40 includes the subject matter of Example 39, wherein sorting includes sorting the plurality of tasks first in ascending order based on latency deadlines of the tasks, and, within tasks of a same latency deadline, based on average latency cost.

Example 41 includes the subject matter of Example 39, wherein sorting includes sorting the plurality of tasks by grouping the sets of tasks with dependencies into respective single blocks of tasks, and wherein, for tasks with dependencies, determining the allocation of the each of the tasks includes determining an allocation of the each of the single blocks of tasks.

Example 42 includes the subject matter of Example 39, wherein the one or more core availability criteria include whether a worst-case latency cost of the each of the tasks fits within a remaining latency budget of a candidate core of the plurality of cores being evaluated to be the next available core.

Example 43 includes the subject matter of Example 38, determining the allocation of individual ones of the plurality of tasks among the plurality of cores includes generating an allocation X of the plurality of tasks to the plurality of cores, allocation X being determined based on a minimal energy consumption of the plurality of cores of the system.

Example 44 includes the subject matter of Example 38, wherein determining an allocation of individual ones of the plurality of tasks among the plurality of cores using a reinforcement learning (RL) model to: determine a set of allocations to generate a suggested allocation of the plurality of tasks to the plurality of cores, wherein determination of each individual allocation of the set of allocations comprises: determining a predicted allocation of a task of the plurality of tasks on a next available one of the plurality of cores based on remaining tasks of the plurality of tasks to be allocated; for the next available one of the plurality of cores: sorting corresponding tasks in the predicted allocation based on their latency deadlines and based on their dependencies; estimating a total energy to be used by the next available one of the plurality of cores in an execution of the corresponding tasks; and generate a final reward value for the suggested allocation in response to a determination that dependencies between the sets of tasks and the latencies of the respective ones of the plurality of tasks have been satisfied.

Example 45 includes the subject matter of Example 44, the operations further including using a reinforcement learning (RL) model to generate an intermediate reward value for one or more individual allocations of the set of allocations during a training phase of the RL model, the intermediate reward value based on a determination that at least one tasks in the one or more individual allocations is to overflow, or a determination that at least one task remains unallocated.

Example 46 includes the subject matter of Example 45, the operations further including, during the training phase, determining the allocation of the individual ones of the plurality of tasks by recursively determining training allocations of individual ones of the plurality of tasks, wherein each successive recursion is to be based on a higher intermediate reward value than a prior recursion.

Example 47 includes the subject matter of Example 45, the operations further including generating the intermediate reward by at least one of: in response to a determination that a task in the one or more individual allocations is to overflow, generate the intermediate reward value to be based on a ratio of a completion time of the task that is to overflow and a latency deadline of the task that is to overflow; or in response to a determination that at least one task remains unallocated, generate the intermediate value to equal a positive value.

Example 48 includes the subject matter of Example 47, wherein the intermediate reward value based on the ratio of the completion time of the task that is to overflow and the latency deadline of the task that is to overflow corresponds to $$\min_{i,k} 1 - \frac{TC_i}{T_{k,i}},$$

where i denotes a task number of the task that is to overflow, k denotes task type, $T_{Ci}$ is the completion time and $T_{ki}$ is the latency deadline.

Example 49 includes the subject matter of Example 47, wherein the positive value is equal to 1.

Example 50 includes the subject matter of Example 44, wherein the final reward value is based on a sum of all energy $E_i$ consumed by the plurality of cores for all tasks i of the plurality of tasks if all tasks i were to be executed.

Example 51 includes the subject matter of Example 50, wherein the final reward value is based on the sum of all energy $E_i$ divided by $E_{max}$, with $E_{max}$ denoting energy consumed by the plurality of cores at full load.

Example 52 includes the subject matter of Example 51, wherein the final reward value is further based on a ratio of a number Ne of empty cores and a total number N of the plurality of cores.

Example 53 includes the subject matter of Example 52, wherein the final reward value is given by $$\beta * \left(1 - \frac{\Sigma_i E_i}{E_{max}} + \lambda * \frac{N_e}{N}\right),$$

where i denotes a task number within the plurality of tasks, β is a final reward amplification factor, and λ is a factor that corresponds to an empty core reward factor.

Example 54 includes the subject matter of Example 44, wherein, for the next available one of the plurality of cores, sorting the corresponding tasks in the predicted allocation includes first sorting the corresponding tasks in the predicted allocation by latency deadlines thereof, and then, within each group of tasks of a same latency deadline, sorting the corresponding tasks based on their dependencies.

Example 55 includes the subject matter of Example 44, wherein, for the next available one of the plurality of cores, sorting the corresponding tasks in the predicted allocation based on the dependencies includes using an encoding of a dependency vector that includes a dependency length parameter to indicate whether a given task type has a dependency based on any other task type, and a dependency parent parameter that indicates which other task type must be executed before a given task type is executed.

Example 56 includes a method to be performed at an apparatus of a computing node in an edge computing environment, the method comprising: determining dependencies between sets of tasks of a plurality of tasks to be executed by a plurality of cores of a network; determining latency deadlines of respective ones of the plurality of tasks; and determining an allocation of individual ones of the plurality of among the plurality of cores for execution based on the dependencies and based on the latency deadlines.

Example 57 includes the subject matter of Example 56, the operations further including: sorting the plurality of tasks based on the dependencies between the sets of tasks and based on the latency deadlines; and after sorting, storing the plurality of tasks in a pool of sorted unallocated tasks, wherein the processor is to determine the allocation by: fetching each of the tasks based on a sorting order thereof in the pool of sorted unallocated tasks; determining a next available core of the plurality of cores based on one or more core availability criteria; determining an allocation of the each of the tasks to the next available core; and repeating fetching, determining the next available core, and determining an allocation of the each of the tasks until at least one set of the plurality of tasks have been allocated.

Example 58 includes the subject matter of Example 57, wherein sorting includes sorting the plurality of tasks first in ascending order based on latency deadlines of the tasks, and, within tasks of a same latency deadline, based on average latency cost.

Example 59 includes the subject matter of Example 57, wherein sorting includes sorting the plurality of tasks by grouping the sets of tasks with dependencies into respective single blocks of tasks, and wherein, for tasks with dependencies, determining the allocation of the each of the tasks includes determining an allocation of the each of the single blocks of tasks.

Example 60 includes the subject matter of Example 57, wherein the one or more core availability criteria include whether a worst-case latency cost of the each of the tasks fits within a remaining latency budget of a candidate core of the plurality of cores being evaluated to be the next available core.

Example 61 includes the subject matter of Example 56, determining the allocation of individual ones of the plurality of tasks among the plurality of cores includes generating an allocation X of the plurality of tasks to the plurality of cores, allocation X being determined based on a minimal energy consumption of the plurality of cores of the network.

Example 62 includes the subject matter of Example 56, wherein determining an allocation of individual ones of the plurality of tasks among the plurality of cores using a reinforcement learning (RL) model to: determine a set of allocations to generate a suggested allocation of the plurality of tasks to the plurality of cores, wherein determination of each individual allocation of the set of allocations comprises: determining a predicted allocation of a task of the plurality of tasks on a next available one of the plurality of cores based on remaining tasks of the plurality of tasks to be allocated; for the next available one of the plurality of cores: sorting corresponding tasks in the predicted allocation based on their latency deadlines and based on their dependencies; estimating a total energy to be used by the next available one of the plurality of cores in an execution of the corresponding tasks; and generate a final reward value for the suggested allocation in response to a determination that dependencies between the sets of tasks and the latencies of the respective ones of the plurality of tasks have been satisfied.

Example 63 includes the subject matter of Example 62, the operations further including using a reinforcement learning (RL) model to generate an intermediate reward value for one or more individual allocations of the set of allocations during a training phase of the RL model, the intermediate reward value based on a determination that at least one tasks in the one or more individual allocations is to overflow, or a determination that at least one task remains unallocated.

Example 64 includes the subject matter of Example 63, the operations further including, during the training phase, determining the allocation of the individual ones of the plurality of tasks by recursively determining training allocations of individual ones of the plurality of tasks, wherein each successive recursion is to be based on a higher intermediate reward value than a prior recursion.

Example 65 includes the subject matter of Example 63, the operations further including generating the intermediate reward by at least one of: in response to a determination that a task in the one or more individual allocations is to overflow, generate the intermediate reward value to be based on a ratio of a completion time of the task that is to overflow and a latency deadline of the task that is to overflow; or in response to a determination that at least one task remains unallocated, generate the intermediate value to equal a positive value.

Example 66 includes the subject matter of Example 65, wherein the intermediate reward value based on the ratio of the completion time of the task that is to overflow and the latency deadline of the task that is to overflow corresponds to $$\min_{i,k} 1 - \frac{TC_i}{T_{k,i}},$$

where i denotes a task number of the task that is to overflow, k denotes task type, $T_{Ci}$ is the completion time and $T_{ki}$ is the latency deadline.

Example 67 includes the subject matter of Example 65, wherein the positive value is equal to 1.

Example 68 includes the subject matter of Example 62, wherein the final reward value is based on a sum of all energy $E_i$ consumed by the plurality of cores for all tasks i of the plurality of tasks if all tasks i were to be executed.

Example 69 includes the subject matter of Example 68, wherein the final reward value is based on the sum of all energy $E_i$ divided by $E_{max}$, with $E_{max}$ denoting energy consumed by the plurality of cores at full load.

Example 70 includes the subject matter of Example 69, wherein the final reward value is further based on a ratio of a number Ne of empty cores and a total number N of the plurality of cores.

Example 71 includes the subject matter of Example 70, wherein the final reward value is given by $$\beta * \left(1 - \frac{\Sigma_i E_i}{E_{max}} + \lambda * \frac{N_e}{N}\right),$$

where i denotes a task number within the plurality of tasks, β is a final reward amplification factor, and λ is a factor that corresponds to an empty core reward factor.

Example 72 includes the subject matter of Example 62, wherein, for the next available one of the plurality of cores, sorting the corresponding tasks in the predicted allocation includes first sorting the corresponding tasks in the predicted allocation by latency deadlines thereof, and then, within each group of tasks of a same latency deadline, sorting the corresponding tasks based on their dependencies.

Example 73 includes the subject matter of Example 62, wherein, for the next available one of the plurality of cores, sorting the corresponding tasks in the predicted allocation based on the dependencies includes using an encoding of a dependency vector that includes a dependency length parameter to indicate whether a given task type has a dependency based on any other task type, and a dependency parent parameter that indicates which other task type must be executed before a given task type is executed.

Example 74.5 includes respective means for performing any of the respective method operations as set forth in any of the method Examples above.

Example 74 includes an apparatus of a computing node in a computing platform, the comprising: means for determining dependencies between sets of tasks of a plurality of tasks to be executed by a plurality of cores of the platform; means for determining latency deadlines of respective ones of the plurality of tasks; and means for determining an allocation of individual ones of the plurality of tasks among the plurality of cores based on the dependencies and based on the latency deadlines.

Example 75 The apparatus of Example 74, further including: means for sorting the plurality of tasks based on the dependencies between the sets of tasks and based on the latency deadlines; and means for, after sorting, storing the plurality of tasks in a pool of sorted unallocated tasks, wherein the processor is to determine the allocation by: fetching each of the tasks based on a sorting order thereof in the pool of sorted unallocated tasks; determining a next available core of the plurality of cores based on one or more core availability criteria; determining an allocation of the each of the tasks to the next available core; and repeating fetching, determining the next available core, and determining an allocation of the each of the tasks until at least one set of the plurality of tasks have been allocated.

Example 76 includes the subject matter of Example 75, wherein the means for sorting includes means for sorting the plurality of tasks first in ascending order based on latency deadlines of the tasks, and, within tasks of a same latency deadline, based on average latency cost.

Example 77 includes the subject matter of Example 75, wherein the means for sorting includes means for sorting the plurality of tasks by grouping the sets of tasks with dependencies into respective single blocks of tasks, and wherein, for tasks with dependencies, determining the allocation of the each of the tasks includes determining an allocation of the each of the single blocks of tasks.

Example 78 includes the subject matter of Example 75, wherein the one or more core availability criteria include whether a worst-case latency cost of the each of the tasks fits within a remaining latency budget of a candidate core of the plurality of cores being evaluated to be the next available core.

Example 79 includes the subject matter of Example 74, wherein the means for determining the allocation of individual ones of the plurality of tasks among the plurality of cores includes means for generating an allocation X of the plurality of tasks to the plurality of cores, allocation X being determined based on a minimal energy consumption of the plurality of cores of the network.

Example 80 includes the subject matter of Example 74, wherein the means for determining an allocation of individual ones of the plurality of tasks among the plurality of cores using a reinforcement learning (RL) model includes: means for determining a set of allocations to generate a suggested allocation of the plurality of tasks to the plurality of cores, wherein determination of each individual allocation of the set of allocations comprises: determining a predicted allocation of a task of the plurality of tasks on a next available one of the plurality of cores based on remaining tasks of the plurality of tasks to be allocated; for the next available one of the plurality of cores: sorting corresponding tasks in the predicted allocation based on their latency deadlines and based on their dependencies; estimating a total energy to be used by the next available one of the plurality of cores in an execution of the corresponding tasks; and means for generating a final reward value for the suggested allocation in response to a determination that dependencies between the sets of tasks and the latencies of the respective ones of the plurality of tasks have been satisfied.

Example 81 includes the subject matter of Example 80, further including using a reinforcement learning (RL) model to generate an intermediate reward value for one or more individual allocations of the set of allocations during a training phase of the RL model, the intermediate reward value based on a determination that at least one tasks in the one or more individual allocations is to overflow, or a determination that at least one task remains unallocated.

Example 82 includes the subject matter of Example 81, further including means for, during the training phase, determining the allocation of the individual ones of the plurality of tasks by recursively determining training allocations of individual ones of the plurality of tasks, wherein each successive recursion is to be based on a higher intermediate reward value than a prior recursion.

Example 83 includes the subject matter of Example 81, further including means for generating the intermediate reward by at least one of: in response to a determination that a task in the one or more individual allocations is to overflow, generate the intermediate reward value to be based on a ratio of a completion time of the task that is to overflow and a latency deadline of the task that is to overflow; or in response to a determination that at least one task remains unallocated, generate the intermediate value to equal a positive value.

Example 84 includes the subject matter of Example 83, wherein the intermediate reward value based on the ratio of the completion time of the task that is to overflow and the latency deadline of the task that is to overflow corresponds to $$\min_{i,k} 1 - \frac{TC_i}{T_{k,i}},$$

where i denotes a task number of the task that is to overflow, k denotes task type, $T_{Ci}$ is the completion time and $T_{ki}$ is the latency deadline.

Example 85 includes the subject matter of Example 83, wherein the positive value is equal to +1.

Example 86 includes the subject matter of Example 80, wherein the final reward value is based on a sum of all energy $E_i$ consumed by the plurality of cores for all tasks i of the plurality of tasks if all tasks i were to be executed.

Example 87 includes the subject matter of Example 86, wherein the final reward value is based on the sum of all energy $E_i$ divided by $E_{max}$, with $E_{max}$ denoting energy consumed by the plurality of cores at full load.

Example 88 includes the subject matter of Example 87, wherein the final reward value is further based on a ratio of a number Ne of empty cores and a total number N of the plurality of cores.

Example 89 includes the subject matter of Example 88, wherein the final reward value is given by $$\beta * \left(1 - \frac{\Sigma_i E_i}{E_{max}} + \lambda * \frac{N_e}{N}\right),$$

where i denotes a task number within the plurality of tasks, β is a final reward amplification factor, and λ is a factor that corresponds to an empty core reward factor.

Example 90 includes the subject matter of Example 80, wherein, for the next available one of the plurality of cores, sorting the corresponding tasks in the predicted allocation includes first sorting the corresponding tasks in the predicted allocation by latency deadlines thereof, and then, within each group of tasks of a same latency deadline, sorting the corresponding tasks based on their dependencies.

Example 91 includes the subject matter of Example 80, wherein, for the next available one of the plurality of cores, sorting the corresponding tasks in the predicted allocation based on the dependencies includes using an encoding of a dependency vector that includes a dependency length parameter to indicate whether a given task type has a dependency based on any other task type, and a dependency parent parameter that indicates which other task type must be executed before a given task type is executed.

What is claimed is:

1. An apparatus of a computing node of a network, the apparatus comprising an interconnect interface to connect the apparatus to one or more components of the computing node, and a processor to:

determine dependencies between sets of tasks of a plurality of tasks to be executed by a plurality of cores of the network;

determine latency deadlines of respective ones of the plurality of tasks;

determine an allocation of individual ones of the plurality of tasks among the plurality of cores to generate an allocation X of the plurality of tasks to the plurality of cores, allocation X being based on the dependencies, on the latency deadlines, and on a minimal energy consumption of the plurality of cores; and send, to one or more of the one or more components of the computing node and through the interconnect interface, communication to cause the computing node to transmit, to the plurality of cores, information based on allocation X, the information for execution of the plurality of tasks by the plurality of cores wherein the processor is to determine allocation X by using a reinforcement learning (RL) model to:

determine a set of allocations to generate a suggested allocation of the plurality of tasks to the plurality of cores, wherein determination of each individual allocation of the set of allocations comprises:

determining a predicted allocation of a task of the plurality of tasks on a next available one of the plurality of cores based on remaining tasks of the plurality of tasks to be allocated;

for the next available one of the plurality of cores:

sorting corresponding tasks in the predicted allocation based on their latency deadlines and based on their dependencies; and estimating a total energy to be used by the next available one of the plurality of cores in an execution of the corresponding tasks; and generate a final reward value for the suggested allocation in response to a determination that dependencies between the sets of tasks and latencies of the respective ones of the plurality of tasks have been satisfied, allocation X dependent on the final reward value.

2. The apparatus of claim 1, the processor to:

sort the plurality of tasks based on the dependencies between the sets of tasks and based on the latency deadlines; and after sorting, store the plurality of tasks in a pool of sorted unallocated tasks in a memory of the network, wherein the processor is to determine the allocation by:

fetching each of the tasks from the memory of the network based on a sorting order thereof in the pool of sorted unallocated tasks;

determining a next available core of the plurality of cores based on one or more core availability criteria;

determining an allocation of said each of the tasks to the next available core; and repeating fetching, determining the next available core, and determining an allocation of said each of the tasks until at least one set of the plurality of tasks has been allocated; and sending, to one or more of the one or more components of the computing node, communication to cause the computing node to send to at least some of the plurality of cores information based on the allocation of said each of the tasks the information for execution of the at least one set of the plurality of tasks by the at least some of the plurality of cores.

3. The apparatus of claim 2, wherein the processor is to sort the plurality of tasks first in ascending order based on latency deadlines of the tasks, and, within tasks of a same latency deadline, based on average latency cost.

4. The apparatus of claim 1, wherein the processor is to use a reinforcement learning (RL) model to generate an intermediate reward value for one or more individual allocations of the set of allocations during a training phase of the RL model, the intermediate reward value based on a determination that at least one task in the one or more individual allocations is to overflow, a determination that an execution of at least one task in the one or more individual allocations is to fail to satisfy a dependency between the sets of tasks, or a determination that at least one task remains unallocated.

5. The apparatus of claim 4, wherein the processor is to, during the training phase, determine allocation X by recursively determining training allocations of individual ones of the plurality of tasks, wherein each successive recursion is to be based on a higher intermediate reward value than a prior recursion.

6. The apparatus of claim 4, wherein the processor is to generate the intermediate reward value by at least one of:

in response to a determination that a task in the one or more individual allocations is to overflow, generate the intermediate reward value to be based on a ratio of a completion time of the task that is to overflow and a latency deadline of the task that is to overflow; or in response to a determination that at least one task remains unallocated, generate the intermediate value to equal a positive value.

7. The apparatus of claim 6, wherein the intermediate reward value based on the ratio of the completion time of the task that is to overflow and the latency deadline of the task that is to overflow corresponds to $$\min_{i,k} 1 - \frac{TC_i}{T_{k,i}},$$

where i denotes a task number of the task that is to overflow, k denotes task type, $T_{Ci}$ is the completion time and $T_{ki}$ is the latency deadline.

8. The apparatus of claim 1, wherein the final reward value is based on a sum of all energy $E_i$ consumed by the plurality of cores for all tasks i of the plurality of tasks if all tasks i were to be executed.

9. The apparatus of claim 8, wherein the final reward value is given by $$\beta * \left(1 - \frac{\Sigma_i E_i}{E_{max}} + \lambda * \frac{N_e}{N}\right),$$

where i denotes a task number within the plurality of tasks, β is a final reward amplification factor, $N_e$ is number of completely empty cores, N is number of cores, and λ is a factor that corresponds to an empty core reward factor.

10. The apparatus of claim 1, wherein the apparatus further comprises a transceiver to provide wireless communication between the apparatus and other edge computing nodes of the network.

11. One or more computer readable media comprising instructions that, when executed by a machine of a computing node of a network, are to cause the machine to perform operations including:

determine dependencies between sets of tasks of a plurality of tasks to be executed by a plurality of cores of the network;

determine latency deadlines of respective ones of the plurality of tasks;

determine an allocation of individual ones of the plurality of tasks among the plurality of cores to generate an allocation X of the plurality of tasks to the plurality of cores, allocation X being based on the dependencies, on the latency deadlines, and on a minimal energy consumption of the plurality of cores;

send, through an interconnect interface, communication to cause the computing node to transmit, to the plurality of cores, information based on allocation X, the information for execution of the plurality of tasks by the plurality of cores; and determine allocation X by using a reinforcement learning (RL) model to:

determine a set of allocations to generate a suggested allocation of the plurality of tasks to the plurality of cores, wherein determination of each individual allocation of the set of allocations comprises:

determining a predicted allocation of a task of the plurality of tasks on a next available one of the plurality of cores based on remaining tasks of the plurality of tasks to be allocated;

for the next available one of the plurality of cores:

sorting corresponding tasks in the predicted allocation based on their latency deadlines and based on their dependencies; and estimating a total energy to be used by the next available one of the plurality of cores in an execution of the corresponding tasks; and generate a final reward value for the suggested allocation in response to a determination that dependencies between the sets of tasks and latencies of the respective ones of the plurality of tasks have been satisfied, allocation X dependent on the final reward value.

12. The one or more computer readable media of claim 11, the operations further including:

sorting the plurality of tasks based on the dependencies between the sets of tasks and based on the latency deadlines; and after sorting, storing the plurality of tasks in a pool of sorted unallocated tasks in a memory of the network, wherein the operations further include determining the allocation by:

fetching each of the tasks from the memory of the network based on a sorting order thereof in the pool of sorted unallocated tasks;

determining a next available core of the plurality of cores based on one or more core availability criteria;

determining an allocation of said each of the tasks to the next available core; and repeating fetching, determining the next available core, and determining an allocation of said each of the tasks until at least one set of the plurality of tasks has been allocated; and sending communication to cause the computing node to send to at least some of the plurality of cores information based on the allocation of said each of the tasks the information for execution of the at least one set of the plurality of tasks by the at least some of the plurality of cores.

13. The one or more computer readable media of claim 12, wherein the one or more core availability criteria include whether a worst-case latency cost of said each of the tasks fits within a remaining latency budget of a candidate core of the plurality of cores being evaluated to be the next available core.

14. The one or more computer readable media of claim 12, the operations further including using a reinforcement learning (RL) model to generate an intermediate reward value for one or more individual allocations of the set of allocations during a training phase of the RL model, the intermediate reward value based on a determination that at least one task in the one or more individual allocations is to overflow, or a determination that at least one task remains unallocated.

15. The one or more computer readable media of claim 14, the operations further including, during the training phase, determining allocation X by recursively determining training allocations of individual ones of the plurality of tasks, wherein each successive recursion is to be based on a higher intermediate reward value than a prior recursion.

16. A distributed edge computing system comprising:

a central server; and a plurality of computing nodes communicably coupled to the central server, at least one of the computing nodes including one or more processors and storing instructions that, when executed by the one or more processors, cause the at least one of the computing nodes to perform operations including:

determining dependencies between sets of tasks of a plurality of tasks to be executed by a plurality of cores of the system;

determining latency deadlines of respective ones of the plurality of tasks; and determining an allocation of individual ones of the plurality of tasks among the plurality of cores to generate an allocation X of the plurality of tasks to the plurality of cores, allocation X being based on the dependencies, on the latency deadlines, and on a minimal energy consumption of the plurality of cores;

sending, through an interconnect interface, communication to cause the computing node to transmit, to the plurality of cores, information based on allocation X, the information for execution of the plurality of tasks by the plurality of cores; and determining an allocation X by using a reinforcement learning (RL) model to:

determine a set of allocations to generate a suggested allocation of the plurality of tasks to the plurality of cores, wherein determination of each individual allocation of the set of allocations comprises:

determining a predicted allocation of a task of the plurality of tasks on a next available one of the plurality of cores based on remaining tasks of the plurality of tasks to be allocated;

for the next available one of the plurality of cores:

sorting corresponding tasks in the predicted allocation based on their latency deadlines and based on their dependencies; and estimating a total energy to be used by the next available one of the plurality of cores in an execution of the corresponding tasks; and generate a final reward value for the suggested allocation in response to a determination that dependencies between the sets of tasks and the latencies of the respective ones of the plurality of tasks have been satisfied, allocation X dependent on the final reward value.

17. The distributed edge computing system of claim 16, the operations further including:

sorting the plurality of tasks based on the dependencies between the sets of tasks and based on the latency deadlines; and after sorting, storing the plurality of tasks in a pool of sorted unallocated tasks in a memory of the computing node, wherein the processor is to determine the allocation by:

fetching each of the tasks based on a sorting order thereof in the pool of sorted unallocated tasks;

determining a next available core of the plurality of cores based on one or more core availability criteria;

determining an allocation of said each of the tasks to the next available core; and repeating fetching, determining the next available core, and determining an allocation of said each of the tasks until at least one set of the plurality of tasks has been allocated; and sending, to the computing node, communication to cause the computing node to send to at least some of the plurality of cores information based on the allocation of said each of the tasks the information for execution of the at least one set of the plurality of tasks by the at least some of the plurality of cores.

18. A method to be performed at an apparatus of a computing node in an edge computing environment, the method comprising:

determining dependencies between sets of tasks of a plurality of tasks to be executed by a plurality of cores of a network;

determining latency deadlines of respective ones of the plurality of tasks; and determining an allocation of individual ones of the plurality of tasks among the plurality of cores to generate an allocation X of the plurality of tasks to the plurality of cores, allocation X being based on the dependencies, on the latency deadlines, and on a minimal energy consumption of the plurality of cores;

sending, through an interconnect interface, communication to cause the computing node to transmit, to the plurality of cores, information based on allocation X, the information for execution of the plurality of tasks by the plurality of cores; and determining allocation X using a reinforcement learning (RL) model by:

determining a set of allocations to generate a suggested allocation of the plurality of tasks to the plurality of cores, wherein determination of each individual allocation of the set of allocations comprises:

determining a predicted allocation of a task of the plurality of tasks on a next available one of the plurality of cores based on remaining tasks of the plurality of tasks to be allocated; and for the next available one of the plurality of cores: sorting corresponding tasks in the predicted allocation based on their latency deadlines and based on their dependencies; and estimating a total energy to be used by the next available one of the plurality of cores in an execution of the corresponding tasks; and generating a final reward value for the suggested allocation in response to a determination that dependencies between the sets of tasks and the latencies of the respective ones of the plurality of tasks have been satisfied.

19. The method of claim 18, further including:

sorting the plurality of tasks based on the dependencies between the sets of tasks and based on the latency deadlines; and after sorting, storing the plurality of tasks in a pool of sorted unallocated tasks in a memory of the computing node, wherein determining the allocation includes:

fetching each of the tasks from the memory based on a sorting order thereof in the pool of sorted unallocated tasks;

determining a next available core of the plurality of cores based on one or more core availability criteria;

determining an allocation of said each of the tasks to the next available core; and repeating fetching, determining the next available core, and determining an allocation of said each of the tasks until at least one set of the plurality of tasks has been allocated; and sending, through an interconnect interface, a communication to cause the computing node to send to at least some of the plurality of cores information based on the allocation of said each of the tasks the information for execution of the at least one set of the plurality of tasks by the at least some of the plurality of cores.

20. The method of claim 18, further including:

using a reinforcement learning (RL) model to generate intermediate reward values for individual allocations of the set of allocations during a training phase of the RL model, each of the intermediate reward values based on a determination that at least one task in said each individual allocation is to overflow, or a determination that at least one task remains unallocated; and during the training phase, determining allocation X by recursively determining training allocations of individual ones of the plurality of tasks, wherein each successive recursion is to be based on a higher intermediate reward value of the intermediate reward values than a prior recursion.

* * * * *